United States Patent
Kang et al.

(10) Patent No.: US 10,234,723 B2
(45) Date of Patent: Mar. 19, 2019

(54) BACKLIGHT UNIT INCLUDING ANISOTROPIC SEMICONDUCTOR NANOCRYSTAL PARTICLES, PRODUCTION METHOD THEREOF, AND ELECTRONIC DEVICE INCLUDING THE SAME

(71) Applicants: SAMSUNG ELECTRONICS CO., LTD., Suwon-si, Gyeonggi-do (KR); University of Chicago, Chicago, IL (US)

(72) Inventors: Hyun A Kang, Suwon-si (KR); Dmitri V. Talapin, Riverside, IL (US); Patrick D. Cunningham, Chicago, IL (US); Eun Joo Jang, Suwon-si (KR)

(73) Assignees: SAMSUNG ELECTRONICS CO., LTD., Gyeonggi-Do (KR); THE UNIVERSITY OF CHICAGO, Chicago, IL (US)

( * ) Notice: Subject to any disclaimer, the term of this patent is extended or adjusted under 35 U.S.C. 154(b) by 2 days.

(21) Appl. No.: 15/147,473

(22) Filed: May 5, 2016

(65) Prior Publication Data
US 2017/0322451 A1    Nov. 9, 2017

(51) Int. Cl.
*G02F 1/1335* (2006.01)
*C09K 11/88* (2006.01)
(Continued)

(52) U.S. Cl.
CPC ........ *G02F 1/133603* (2013.01); *C09K 11/02* (2013.01); *C09K 11/883* (2013.01);
(Continued)

(58) Field of Classification Search
CPC ....... B29D 11/00; C09K 11/883; C09K 11/02; G02F 1/133603; G02F 1/133606;
(Continued)

(56) References Cited

U.S. PATENT DOCUMENTS 8,357,308 B1    1/2013    Strouse et al.
9,146,419 B1 *  9/2015    Anandan ............ G02B 6/0035
(Continued)

FOREIGN PATENT DOCUMENTS

JP    1999-293241 A    10/1999
KR    2013-0046308 A    5/2013
(Continued)

OTHER PUBLICATIONS

Kim, GeunHyung, A PMMA composite as an optical diffuser in a liquid crystal display backlighting unit (BLU), 2005, European Polymer Journal 41, 1729-1737.*
(Continued)

*Primary Examiner* — Eli D. Strah
(74) *Attorney, Agent, or Firm* — Cantor Colburn LLP

(57) ABSTRACT

A backlight unit including:
  a light source; and
  a photoconversion layer disposed separately from the light source to convert a wavelength of incident light from the light source and thereby provide converted light, wherein the photoconversion layer includes a polymer matrix and a plurality of anisotropic semiconductor nanocrystals disposed in the polymer matrix, and wherein the polymer matrix includes a polymer having a repeating unit represented by Chemical Formula 1:
(Continued)

Chemical Formula 1

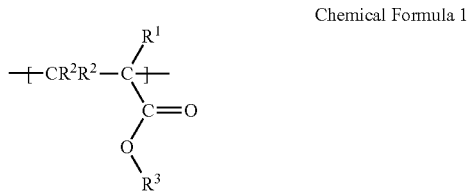

wherein $R^1$ is hydrogen or a methyl group, each $R^2$ is independently hydrogen or a C1 to C3 alkyl group, and $R^3$ is a C2 to C5 alkyl group, wherein the polymer exhibits elasticity at a temperature between a glass transition temperature of the polymer and about 100° C., and wherein the plurality of anisotropic semiconductor nanocrystals are aligned along a long axis thereof for the photoconversion layer to emit polarized light.

19 Claims, 16 Drawing Sheets
(3 of 16 Drawing Sheet(s) Filed in Color)

(51) Int. Cl.
C09K 11/02 (2006.01)
B29D 11/00 (2006.01)

(52) U.S. Cl.
CPC .... *G02F 1/13362* (2013.01); *G02F 1/133602* (2013.01); *G02F 1/133606* (2013.01); *B29D 11/00* (2013.01); *B32B 2457/202* (2013.01); *G02F 1/133514* (2013.01); *G02F 1/133528* (2013.01); *G02F 2001/133531* (2013.01); *G02F 2001/133562* (2013.01); *G02F 2001/133567* (2013.01); *G02F 2001/133614* (2013.01); *G02F 2202/08* (2013.01); *G02F 2202/10* (2013.01); *G02F 2202/36* (2013.01); *G02F 2203/05* (2013.01); *Y10T 428/105* (2015.01); *Y10T 428/1036* (2015.01)

(58) Field of Classification Search
CPC ......... G02F 1/133528; G02F 1/133514; G02F 2001/133614; G02F 2001/133567; G02F 2001/133562; G02F 2001/133531; G02F 2202/08; G02F 2202/10; G02F 2203/05; G02F 1/133602; G02F 1/13362; G02F 2202/36; Y10T 428/1036; Y10T 428/105; B32B 2457/202

See application file for complete search history.

(56) References Cited

U.S. PATENT DOCUMENTS

| | | | | |
|---|---|---|---|---|
| 2012/0113672 A1* | 5/2012 | Dubrow | ............... | B82Y 20/00 362/602 |
| 2013/0107170 A1 | 5/2013 | Gee et al. | | |
| 2014/0009902 A1 | 1/2014 | Banin et al. | | |
| 2014/0362556 A1 | 12/2014 | Cho et al. | | |
| 2015/0177447 A1* | 6/2015 | Woodgate | ............... | H01L 33/62 359/296 |
| 2015/0218442 A1 | 8/2015 | Jun et al. | | |

FOREIGN PATENT DOCUMENTS

| | | | |
|---|---|---|---|
| KR | 2013-0046495 A | 5/2013 | |
| KR | 2014-0144571 A | 12/2014 | |
| KR | 1525525 B1 | 5/2015 | |
| WO | WO 2011031871 A1 * | 3/2011 | ............... C08K 9/10 |

OTHER PUBLICATIONS

Krevelen et al., Properties of Polymers—Their Correlation with Chemical Structure; Their Numerical Estimation and Prediction from Additive Group Contributions, 2009, (4th, Completely Revised Edition) Elsevier Online version available at: http://app.knovel.com/hotlink/toc/id:kpPPTCCSTB/properties-polymers-their/properties-polymers-their.*

Arsenault et al., From colour fingerprinting to the control of photoluminescence in elastic photonic crystals, 2006, nature materials, 5, 179-184.*

Cunningham, Patrick D., et al., Assessment of Anisotropic Semiconductor Nanorod and Nanoplatelet Heterostructures with Polarized Emission for Liquid Crystal Display Technology, May 20, 2016, ACS Nano, 10, pp. 5769-5781.*

S. Ithurria et al. "Colloidal Nanoplatelets with Two-Dimensional Electronic Structure", Nature Materials, vol. 10, 2011, 936-941.

S. Schmitt-Rink et al. "Linear and Nonlinear Optical Properties of Semiconductor Quantum Wells", Advances in Physics, 1989, vol. 38, No. 2, 89-188.

S.A. Empedocles et al. "Three-Dimensional Orientation Measurements of Symmetric Single Chromophores Using Polarization Microscopy", Nature, vol. 399, 1999, 126-130.

Sandrine Ithurria et al. "Colloidal Atomic Layer Deposition (c-ALD) using Self-Limiting Reactions at Nanocrystal Surface Coupled to Phase Transfer between Polar and Nonpolar Media", J. Am. Chem. Soc. 2012, 134, 18585-18590.

Sandrine Ithurria et al. "Quasi 2D Colloidal CdSe Platelets with Thickness Controlled at the Atomic Level", J. Am. Chem. Soc. 2008, 130, 16504-16505.

Stefano Vezzoli et al. "Exciton Fine Structure of CdSe/CdS Nanocrystals Determined by Polarization Microscopy at Room Temperature", ACS Nano, 2015, vol. 9, No. 8, 7992-8003.

Stephen Bucaro "Anatomy of a Liquid Crystal Display (LCD)", http://bucarotechelp.com/computers/anatomy/91060003.asp, May 4, 2016.

Tae-Ho Kim et al. "Bright and Stable Quantum Dots and Their Applications in Full-Color Displays", MRS Bulletin, vol. 38, 2013, 712-720.

Tae-Ho Kim et al. "Full-Colour Quantum Dot Displays Fabricated by Transfer Printing", Nature Photonics, vol. 5, 2011, 176-182.

Tangi Aubert et al. "Large-Scale and Electroswitchable Polarized Emission from Semiconductor Nanorods Aligned in Polymeric Nanofibers", ACS Photonics 2015, 2, 583-588.

Tao Du et al. "Combination of Photoinduced Alignment and Self-Assembly to Realize Polarized Emission from Ordered Semiconductor Nanorods", ACS Nano, 2015, vol. 9, No. 11, 11049-11055.

Tie Wang et al. "Self-Assembled Colloidal Superparticles from Nanorods", Science, vol. 338, (2012) 358-363.

Wan Ki Bae et al. "Spectroscopic Insights into the Performance of Quantum Dot Light-Emitting Diodes", MRS Bulletin, vol. 38, 2013, 721-729.

Xiaogang Peng et al. "Shape Control of CdSe Nanocrystals", Nature, vol. 404, 2000, 59-61.

Yasuhiro Shirasaki et al. "Emergence of Colloidal Quantum-Dot Light-Emitting Technologies", Nature Photonics, vol. 7, 2013, 13-23.

Yorai Amit et al. "Semiconductor Nanorod Layers Aligned Through Mechanical Rubbing", Phys. Status Solidi A 209, No. 2, 235-242 (2012).

"Philips Introduces Quantum Dot TV with Color IQ(TM) Technology from QD Vision. In Manufacturer is First to Offer Quantum Dot Displays for Both TVs and Monitors", www.qdvision.com, 2015.

A. Shabaev et al. "1D Exciton Spectroscopy of Semiconductor Nanorods", Nano Letters, 2004, vol. 4, No. 10, 1821-1825.

Alexander W. Achtstein et al. "Electronic Structure and Exciton-Phonon Interaction in Two-Dimensional Colloidal CdSe Nanosheets", Nano Lett. 2012, 12, 3151-3157.

Amit Sift et al. "Highly Emissive Nano Rod-in-Rod Heterostructures with Strong Linear Polarization", Nano Lett. 2011, 11, 2054-2060.

(56) References Cited

OTHER PUBLICATIONS

Aurora Rizzo et al. "Polarized Light Emitting Diode by Long-Range Nanorod Self-Assembling on a Water Surface", ACS Nano 2009, vol. 3, No. 6, 1506-1512.
Benhamin T. Diroll et al. "Interpreting the Energy-Dependent Anisotropy of Colloidal Nanorods Using Ensemble and Single-Particle Spectroscopy", J. Phys. Chem. C 2013, 117, 23928-23937.
Benjamin Abecassis et al. "Self-Assembly of CdSe Nanoplatelets into Giant Micrometer-Scale Needles Emitting Polarized Light", Nano Lett. 2014, 14, 710-715.
Benjamin T. Diroll et al. "Tunable Optical Anisotropy of Seeded CdSe/CdS Nanorods", J. Phys. Chem. Lett. 2014, 5, 85-91.
Benjamin T. Diroll et al. "Smectic Nanorod Superlattices Assembled on Liquid Subphases: Structure, Orientation, Defects, and Optical Polarization", Chem. Mater. 2015, 27, 2998-3008.
Burak Guzelturk et al. "Stacking in Colloidal Nanoplatelets: Tuning Excitonic Properties", ACS Nano, 2004, vol. 8, No. 12, 12524-12533.
C. Bullen et al. "The Effects of Chemisorption on the Luminescence of CdSe Quantum Dots", Langmuir, 2006, 22, 3007-3013.
C.B. Murray et al. "Synthesis and Characterization of Nearly Monodisperse CdE (E=Sulfur, Selenium, Tellurium) Semiconductor Nanocrystallites", J. Am. Chem. Soc. 1993, 115, 8706-8715.
Christos Grivas et al. "Single-Mode Tunable Laser Emission in the Single-Exciton Regime from Colloidal Nanocrystals", Nature Communications, 2013, 1-9.
Chunxing She et al. "Low-Threshold Stimulated Emission Using Colloidal Quantum Wells", Nano Lett. 2014, 14, 2772-2777.
Chunxing She et al. "Red, Yellow, Green, and Blue Amplified Spontaneous Emission and Lasing Using Colloidal CdSe Nanoplatelets", ACS Nano, 2015, vol. 9, No. 10, 9475-9485.
D.J. Norris et al. "Measurement of the Size Dependent Hole Spectrum in CdSe Quantum Dots", Phys. Rev. Lett., vol. 72, No. 16, 1994, 2612-2615.
Deniz Bozyigit et al. "Challenges and Solutions for High-Efficiency Quantum Dot-Based LEDs", MRS Bulletin, vol. 38, 2013, 731-736.
Dmitri V. Talapin et al. "Etching of Colloidal InP Nanocrystals with Fluorides: Photochemical Nature of the Process Resulting in High Photoluminescence Efficiency", J. Phys. Chem. B 2002, 106, 12659-12663.
Dmitri V. Talapin et al. "Highly Emissive Colloidal CdSe/CdS Heterostructures of Mixed Dimensionality", Nano Letters 2003, vol. 3, No. 12, 1677-1681.
Dmitri V. Talapin et al. "Quantum Dot Light-Emitting Devices", MRS Bulletin, vol. 38, 2013, 685-691.
Dmitri V. Talapin et al. "Seeded Growth of Highly Luminescent CdSe/CdS Nanoheterostructures with Rod and Tetrapod Morphologies", Nano Letters, 2007, vol. 7, No. 10, 2951-2959.
Elina Ploshnik et al. "Hierarchical Surface Patterns of Nanorods Obtained by Co-Assembly with Block Copolymers in Ultrathin Films", Adv. Mater. 2010, 22, 2774-2779.
Eunjoo Jang et al. "White-Light-Emitting Diodes with Quantum Dot Color Converters for Display Backlights", Adv. Mater. 2010, 22, 3076-3080.
Francesco Meinardi et al. "Large-Area Luminescent Solar Concentrators Based on 'Stokes-Shift-Engineered' Nanocrystals in a Mass-Polymerized PMMA Matrix", Nature Photonics, vol. 8, 2014, 392-399.
Geoffrey J. Supran et al. "QLEDs for Displays and Solid-State Lighting", MRS Bulletin, vol. 38, 2013, 703-711.
Ido Hadar et al. "Polarization Properties of Semiconductor Nanorod Heterostructures: From Single Particles to the Ensemble", J. Phys. Chem. Lett. 2013, 4, 502-507.
Igor Coropceanu et al. "Core/Shell Quantum Dot Based Luminescent Solar Concentrators with Reduced Reabsorption and Enhanced Efficiency", Nano Lett. 2014, 14, 4097-4101.

Igor Coropceanu et al. "Slow-Injection Growth of Seeded CdSe/CdS Nanorods with Unity Fluorescence Quantum Yield and Complete Shell to Core Energy Transfer", ACS Nano 2016, 10, 3295-3301.
Jiangtao Hu, et al., "Linearly Polarized Emission from Colloidal Semiconductor Quantum Rods", Science, vol. 292, 2001, 2060-2062.
John Sundar Kamal et al. "Direct Determination of Absorption Anisotropy in Colloidal Quantum Rods", Physical Review B 85, 035126-1 to 035126-7 (2012).
Jorge Perez-Juste et al. "Optical Control and Patterning of Gold-Nanorod-Poly(vinyl alcohol) Nanocomposite Films", Adv. Funct. Mater. 2005, 15, 1065-1071.
Kari Thorkelsson et al. "End-to-End Alignment of Nanorods in Thin Films", Nano Lett. 2013, 13, 4908-4913.
Kevin M. Ryan et al. "Electric-Field-Assisted Assembly of Perpendicularly Oriented Nanorod Superlattices", Nano Letters, 2006, vol. 6, No. 7, 1479-1482.
Kimani A. Stancil "Evaporation Assisted CdSe Nanorod Assembly by Small Angle X-ray Scattering and Langmuir Adsorption", J. Phys. Chem. B 2014, 118, 14695-14702.
Kirt A. Page et al. "SAXS Analysis of the Thermal Relaxation of Anisotropic Morphologies in Oriented Nafion Membranes", Macromolecules, 2006, 39, 3939-3946.
Lee Ann Kim et al. "Contact Printing of Quantum Dot Light-Emitting Devices", Nano Letters 2008, vol. 8, No. 12 4513-4517.
Liang-Shi Li et al. "Semiconductor Nanorod Liquid Crystals and Their Assembly on a Substrate", Adv. Mater. 2003, 15, No. 5, 408-410.
Lucia Hartmann et al. "Large-Scale Simultaneous Orientation of CdSe Nanorods and Regioregular Poly(3-hexylthiophene) by Mechanical Rubbing", Macromolecules 2013, 46, 6177-6186.
Luigi Carbone et al. "Synthesis and Micrometer-Scale Assembly of Colloidal CdSe/CdS Nanorods Prepared by a Seeded Growth Approach", Nano Letters, 2007, vol. 7, No. 10, 2942-2950.
M.D. M D Tessier et al. "Spectroscopy of Colloidal Semiconductor Core/Shell Nanoplatelets with High Quantum Yield", Nano Lett. 2013, 13, 3321-3328.
Matthew Pelton et al. "Carrier Cooling in Colloidal Quantum Wells", Nano Lett. 2012, 12, 6158-6163.
Noah D. Bronstein et al. "Luminescent Solar Concentration with Semiconductor Nanorods and Transfer-Printed Micro-Silicon Solar Cells", ACS Nano vol. 8, No. 1, 44-53, 2014.
Olga I. Micic et al. "Highly efficient band-edge emission from InP quantum dots", Appl. Phys. Left. 68 (22), 1996.
David A.B. Miller Optical Physics of Quantum Wells. In Quantum Dynamics of Simple Systems, G.-L. Oppo, S.M.B, E. Riis, and M. Wilkinson, Ed. Institute of Physics: London, 1996, pp. 239-266.
Ou Chen et al. "Compact High-Quality CdSe—CdS Core-Shell Nanocrystals with Narrow Emission Linewidths and Suppressed Blinking", Nature Materials, vol. 12, 2013, 445-451.
Ou Chen et al. "Pure Colors from Core-Shell Quantum Dots", MRS Bulletin, vol. 38, 2013, 696-736.
Patrick D. Cunningham et al. "Assessment of Anisotropic Semiconductor Nanorod and Nanoplatelet Heterostructures with Polarized Emission for LCD Technology", Suppporting Information S-1 to S-14, May 20, 2016.
R. Clark Jones, "A Generalization of the Dielectric Ellipsoid Problem", Physical Review, vol. 68, Nos. 3 and 4, 1945, 93-96.
Rifat A. M. Hikmet et al. "Polarized-Light-Emitting Quantum-Rod Diodes", Adv. Mater. 2005, 17, 1436-1439.
S. Adam et al. "The effect of nanocrystal surface structure on the luminescence properties: Photoemission study of HF-etched InP nanocrystals", The Journal of Chemical Physics 123, 084706 (2005).

\* cited by examiner

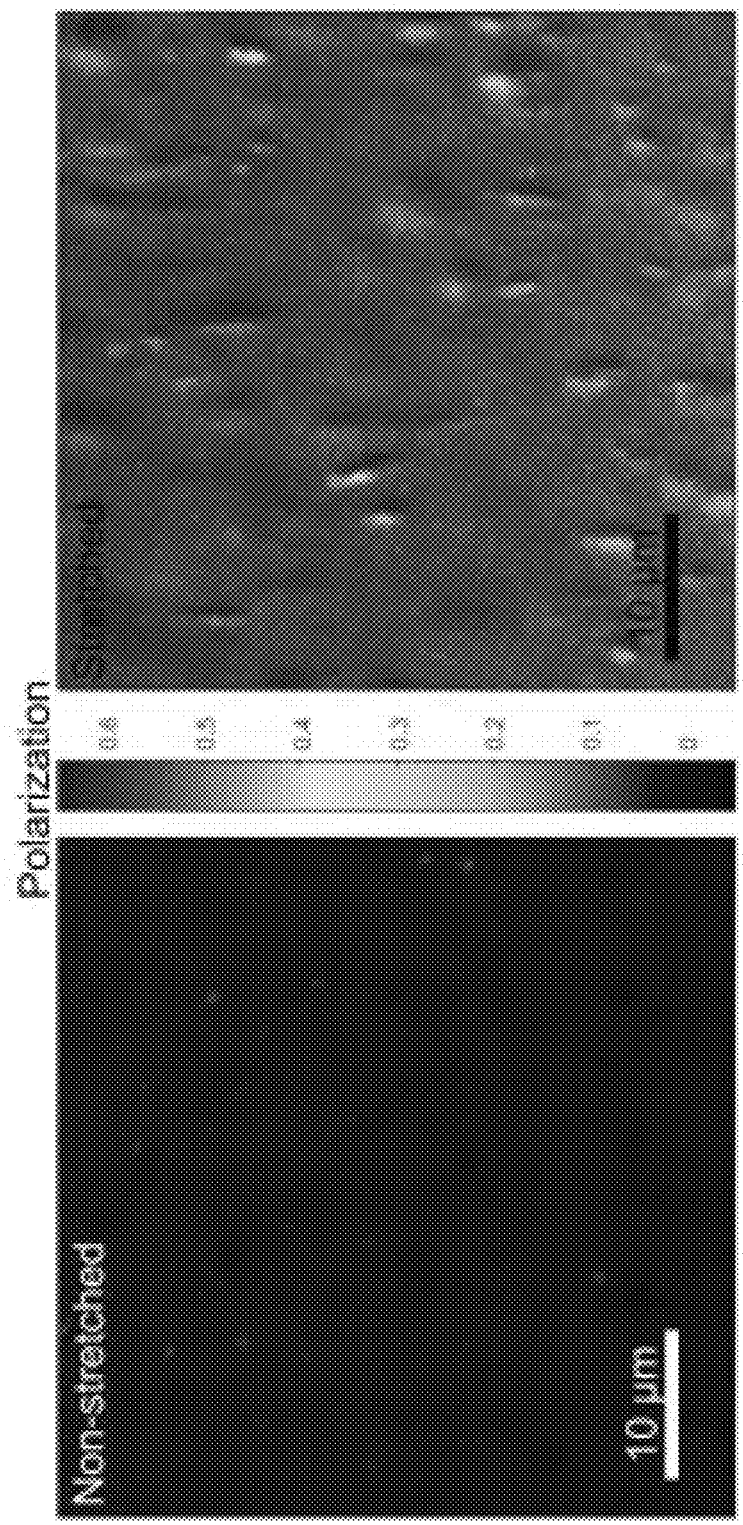

Stretching axis

BACKLIGHT UNIT INCLUDING ANISOTROPIC SEMICONDUCTOR NANOCRYSTAL PARTICLES, PRODUCTION METHOD THEREOF, AND ELECTRONIC DEVICE INCLUDING THE SAME

BACKGROUND

1. Field

A backlight unit including anisotropic semiconductor nanocrystal particles, a production method thereof, and an electronic device including the same are disclosed.

2. Description of the Related Art

Liquid crystal displays (LCDs) are non-emissive display units that cannot emit light by themselves and require incident light from outside to form an image. Therefore, the LCD conventionally has a backlight unit located at its rear side so as to emit light.

LCD technology uses a backlight unit which transmits light through a device stack containing polarizers, liquid crystals, and color filters. The transparency of each pixel may be adjusted by applying voltages across the liquid crystal cell. Traditional LCD technology utilizes color filters to generate color pixels from a white light source, which leads to large energy loss and requires efficient heat dissipation within the LCD stack.

As a novel type of a light emitting material having enhanced brightness and color purity, quantum dots (QDs) have been utilized extensively in modern display technologies. For example, some LCD devices include a white light emitting backlighting layer containing QDs. Properties of the QDs (e.g., brightness and color purity) may be optimized through colloidal synthesis of nanometer-sized crystals of direct-gap semiconductors by modulating their size and composition. Therefore, the QDs may contribute to improving the display quality of the LCD device.

However, the conventional LCD technologies mainly use materials emitting non-polarized light, and due to the light absorption by the polarizer and the color filter, only a small portion (e.g., about 15% or even about 5% to 6%) of light emitted from the backlight layer may pass through the device. Therefore, there remains a need to develop a technology that may increase optical efficiency of the LCD device using the QDs.

SUMMARY

An embodiment is directed to a backlight unit that may enhance optical efficiency of an LCD device.

Another embodiment is directed to a method of producing the backlight unit.

Still another embodiment is directed to a display device including the backlight unit.

Yet another embodiment is directed to an anisotropic semiconductor nanocrystal particle-polymer composite film that may emit polarized light.

In an embodiment, a backlight unit includes:
a light source; and
a photoconversion layer disposed separately from the light source to convert a wavelength of incident light from the light source and thereby provide converted light,
wherein the photoconversion layer includes a polymer matrix and a plurality of anisotropic semiconductor nanocrystals disposed in the polymer matrix, and wherein the polymer matrix includes a polymer having a repeating unit represented by Chemical Formula 1:

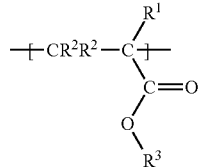

Chemical Formula 1 wherein $R^1$ is hydrogen or a methyl group, each $R^2$ is independently hydrogen or a C1 to C3 alkyl group, and $R^3$ is a C2 to C5 alkyl group, wherein the polymer exhibits elasticity at a temperature between a glass transition temperature of the polymer and about 100° C., and wherein the plurality of anisotropic semiconductor nanocrystals are aligned along a long axis thereof for the photoconversion layer to emit polarized light.

The glass transition temperature may be between about 10° C. and about 70° C.

The glass transition temperature may be between about 20° C. and about 60° C.

The polymer may be dissolved in a solvent capable of dispersing the semiconductor nanocrystal particles.

The solvent may include chloroform, toluene, or a combination thereof.

The polymer matrix may be uniaxially stretched.

The polymer may include polypropyl(meth)acrylate, poly(propyl-co-isopropyl)(meth)acrylate, polybutyl(meth)acrylate, poly(butyl-co-isobutyl)(meth)acrylate, or a combination thereof.

The anisotropic semiconductor nanocrystals may include a nanorod, a nanoplatelet, or a combination thereof.

The nanorod may include a dot-in-rod type, a rod-in-rod type, or a combination thereof.

The anisotropic semiconductor nanocrystals may include a Group II-VI compound, a Group III-V compound, a Group IV-VI compound, a Group IV element or compound, or a combination thereof.

The anisotropic semiconductor nanocrystals may have a quantum yield of greater than or equal to about 70%.

The anisotropic semiconductor nanocrystals may have a full width at half maximum (FWHM) of less than or equal to about 30 nanometers.

The anisotropic semiconductor nanocrystals may have an aspect ratio of about 1.5 to about 8.0.

The amount of the anisotropic semiconductor nanocrystals may be from about 0.1 parts by weight to about 30 parts by weight per 100 parts by weight of the polymer.

The polarized light from the photoconversion layer may have a degree of polarization of about 0.5 to about 0.85 as defined by Mathematical Formula 1:

$$(I_{//} - I_\perp)/(I_{//} + I_\perp) \qquad \text{Mathematical Formula 1}$$

wherein $I_{//}$ is an integrated area of a photoluminescence peak of a photoluminescence spectrum of the converted light obtained when the major axis of a polarization filter is parallel to the aligned direction of the anisotropic semiconductor nanocrystals, and $I_\perp$ is an integrated area of a photoluminescence peak of a photoluminescence spectrum of the converted light obtained when the major axis of a polarization filter is perpendicular to the aligned direction of the anisotropic semiconductor nanocrystals.

The backlight unit may further include a barrier layer disposed on the photoconversion layer.

In another embodiment, a method of producing the aforementioned backlight unit may include:
 obtaining a light source;
 preparing a light conversion layer; and
 disposing the photoconversion layer on the light source,
 wherein the preparing of the photoconversion layer includes
 obtaining a free-standing film including a polymer matrix and a plurality of anisotropic semiconductor nanocrystals disposed in the polymer matrix, wherein the polymer matrix includes a polymer having a repeating unit represented by Chemical Formula 1:

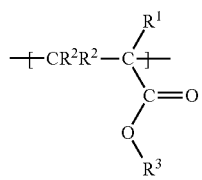

Chemical Formula 1 wherein $R^1$ is hydrogen or a methyl group, each $R^2$ is independently hydrogen or a C1 to C3 alkyl group, and $R^3$ is a C2 to C5 alkyl group,
 wherein the polymer exhibits elasticity at a temperature between a glass transition temperature of the polymer and about 100° C.; and
 stretching the free-standing film at a temperature of greater than or equal to about the glass transition temperature of the polymer.

The stretching of the free-standing film may be carried out at a temperature of less than or equal to about 100° C.

The stretching may be carried out at a temperature of less than or equal to about 70° C.

The stretching may be carried out in such a way that the length of the stretched standing film is less than or equal to about 6 times the initial length thereof.

In another embodiment, a liquid crystal display includes:
 a liquid crystal panel including a lower substrate, an upper substrate, a liquid crystal layer interposed between the lower substrate and the upper substrate, and a color filter disposed on a surface of the upper substrate; and the aforementioned backlight unit disposed below the lower substrate of the liquid crystal panel.

In still another embodiment, a semiconductor nanocrystal-polymer composite includes:
 a polymer matrix and a plurality of anisotropic semiconductor nanocrystals disposed in the polymer matrix, wherein the polymer matrix includes a polymer having a repeating unit represented by Chemical Formula 1:

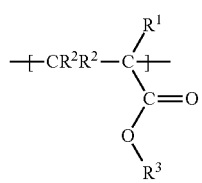

Chemical Formula 1 wherein $R^1$ is hydrogen or a methyl group, each $R^2$ is independently hydrogen or a C1 to C3 alkyl group, and $R^3$ is a C2 to C5 alkyl group,
 wherein the polymer exhibits elasticity at a temperature between a glass transition temperature of the polymer and about 100° C.,
 and wherein the plurality of anisotropic semiconductor nanocrystals are aligned along a long axis thereof for the photoconversion layer to emit polarized light.

According to an embodiment, the backlight unit includes anisotropic semiconductor nanocrystals capable of emitting linear-polarized light at relatively high efficiency. Polarization of light in these systems, confirmed through single-rod spectroscopy, may result from the anisotropy of the transition dipole moment and dielectric confinement effects. In some embodiments, emission polarization may be accomplished in macroscopic semiconductor-polymer composite films containing CdSe/CdS nanorods and colloidal CdSe nanoplatelets. Anisotropic nanocrystals disposed (e.g., dispersed) in a certain polymer having a repeating unit of Chemical Formula 1 may be stretched mechanically in order to obtain unidirectionally aligned arrays.

In some embodiments, significant optical anisotropy and emission polarization for the anisotropic semiconductor nanocrystals (e.g., nano-rods or 2D CdSe nanoplatelets with an electronic structure of quantum wells) may be accomplished. The aligned anisotropic semiconductor nanocrystals (e.g., nanorod or NPL) arrays may serve as optical funnels, absorbing unpolarized light and re-emitting light from deep-green to red with quantum efficiencies of over 90% and a high degree of linear polarization. The backlight units of the aforementioned embodiments may realize the benefits of anisotropic nanostructures for LCD backlighting. The polymer films with aligned CdSe/CdS dot-in-rod and rod-in-rod nanostructures may show more than two-fold enhancement of polarized luminescent intensity compared to the emitter layers with randomly oriented nanostructures (for example, due to the combination of linearly polarized luminescence and directional emission from individual nanostructures).

BRIEF DESCRIPTION OF THE DRAWINGS

The present patent application contains at least one drawing executed in color. Copies of this application with color drawing(s) will be provided by the Office upon request and payment of the necessary fee.

These and/or other aspects will become apparent and more readily appreciated from the following description of the embodiments, taken in conjunction with the accompanying drawings, in which:

FIG. 4D is a view showing the mapping of fluorescence polarization for ~$10^3$ micron-sized areas of polymer films containing rod-in-rods before and after stretching;

DETAILED DESCRIPTION

Figure 1:
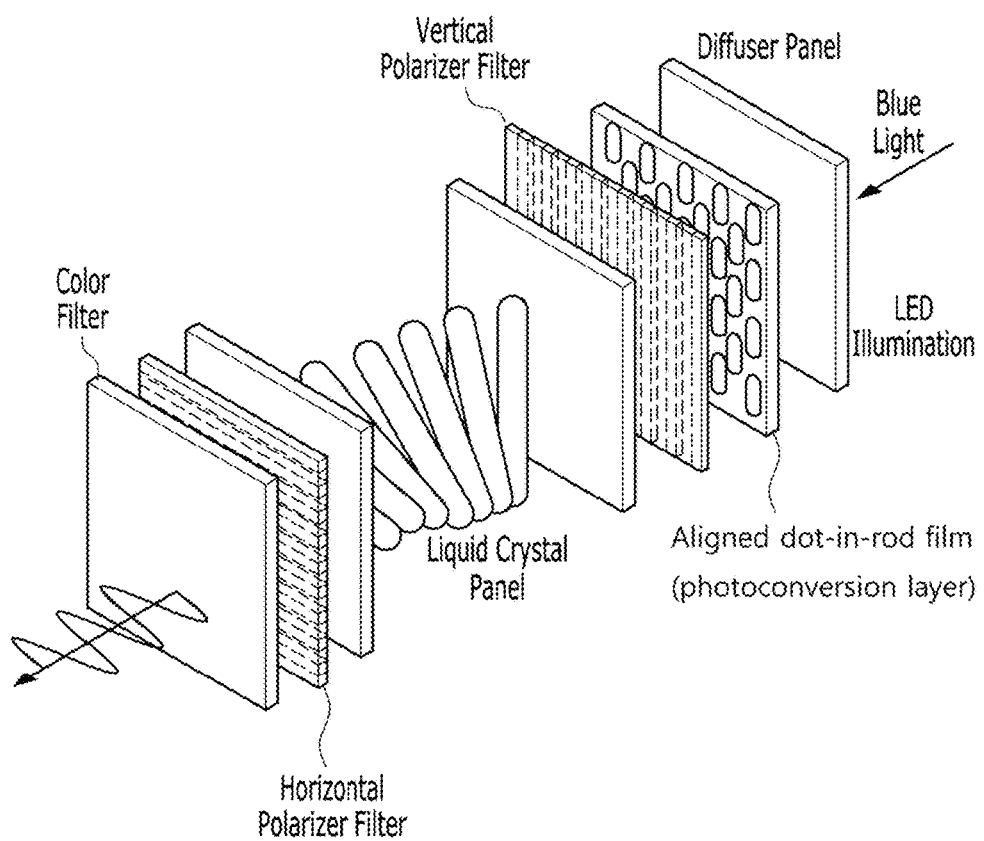
FIG. 1 is an exploded view schematically illustrating a liquid crystal display device in accordance with a non-limiting embodiment.

This disclosure will be described more fully hereinafter in the following detailed description, in which some but not all embodiments of this disclosure are described. This disclosure may be embodied in many different forms and is not to be construed as limited to the embodiments set forth herein; rather, these embodiments are provided so that this disclosure will fully convey the scope of the invention to those skilled in the art. Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having meanings that are consistent with their meanings in the context of the relevant art and the present disclosure, and will not be interpreted in an idealized or overly formal sense unless expressly so defined herein. In addition, unless explicitly described to the contrary, the word "comprise" and variations such as "comprises" or "comprising" will be understood to imply the inclusion of stated elements but not the exclusion of any other elements.

Exemplary embodiments are described herein with reference to illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Unless specifically described to the contrary, a singular form includes a plural form.

In the drawings, the thickness of layers, films, panels, regions, etc., are exaggerated for clarity. Like reference numerals designate like elements throughout the specification.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise. Unless specified otherwise, the term "or" means "and/or." As used herein, the term "and/or" includes any and all combinations of one or more of the associated items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

As used herein, the term "combination thereof" refers to a mixture, a stacked structure, a composite, an alloy, a blend, a reaction product, or the like.

As used herein, the term "alkyl group" may refer to a straight or branched chain saturated aliphatic hydrocarbon group having the specified number of carbon atoms and having a valence of at least one.

As used herein, the term "(meth)acrylate" refers to acrylate and methacrylate.

In an embodiment, the backlight unit includes:
a light source, and
a photoconversion layer disposed separately from the light source to convert a wavelength of incident light from the light source and thereby provide the converted light.

The photoconversion layer includes a polymer matrix including a certain type of polymer and a plurality of anisotropic semiconductor nanocrystals disposed in the polymer matrix, preferably dispersed in the polymer matrix. The photoconversion layer may include a unidirectionally aligned array of the plurality of anisotropic semiconductor nanocrystals, wherein the aligned array may be formed by mechanical stretching.

Semiconductor nanocrystal particles may have a theoretical quantum yield of 100%, and may emit light with enhanced color purity by controlling a nature of a compound included therein and a size thereof. Therefore, an LCD device adopting the same may realize improved color purity. However, even the LCD devices adopting the nanocrystal particles have difficulties in showing increased optical efficiency due to their structural problems such as light loss by a color filter or a polarizer.

By replacing the traditional backlighting with a photoconversion layer capable of emitting polarized light, devices may more efficiently transmit light through a first polarization filter. The anisotropic semiconductor nanocrystal particles (e.g., nanorods or nanoplatelets) may emit linearly polarized light at relatively high efficiency. In addition, highly emissive nano-heterostructures having a narrow FWHM may provide highly pure color emission.

For example, upon excitation with a blue light source, the green and red emitting nanorods may be aligned to increase the intensity of the light emission having directionality parallel to the first polarizer filter and thereby pass through the liquid crystal stack with higher efficiency (see FIG. 1). Additionally, highly pure green and red emitters have a narrow spectral width and thereby may cut off a lesser amount of light by a color filter. Thus, the photoconversion layer of the backlight unit of some embodiments includes the anisotropic semiconductor nanocrystal particles, and the anisotropic semiconductor nanocrystal particles may include a nanorod, a nanoplatelet, or a combination thereof.

The cross-sectional shape (e.g., perpendicular to the length) of the nanorod may be a circle, an ellipse, or polygon, but it is not limited thereto. The nanorod may have an average aspect ratio of greater than or equal to about 1.25, for example, greater than or equal to about 1.5, greater than or equal to about 2.0, or greater than or equal to about 3, and less than or equal to about 10.0, for example, less than or equal to about 8. As used herein, the term "aspect ratio" refers to a ratio of a diameter (that is, the greatest length of a cross-section substantially perpendicular to the length) with respect to the length. When the nanorods have an average aspect ratio within the aforementioned range, they may show improved orientation in the polymer matrix. An average diameter of the nanorod is not particularly limited and may be selected appropriately. For example, the average diameter of the nanorod may be greater than or equal to about 2.5 nanometers (nm), for example, greater than or equal to about 3 nm, greater than or equal to about 4 nm, or greater than or equal to about 5 nm, but it is not limited thereto. The average diameter of the nanorod may be less than or equal to about 7 nm, less than or equal to about 5 nm, or less than or equal to about 4 nm, but it is not limited thereto. In some embodiments, that polarization may be maximized by increased core size and enhanced by a longer, thinner shell. The size of the core may be from about 2 nm to about 5 nm, but it is not limited thereto. In some embodiments, rod-in-rods may have band-edge anisotropy of greater than that of dot-in-rods.

The average thickness of the nanoplatelets may be from about 0.8 nm to about 4 nm. The average lateral size of the nanoplatelets may be greater than or equal to about 5 nm, for example, greater than or equal to about 10 nm and less than or equal to about 50 nm, for example, less than or equal to about 20 nm. The nanoplatelet may have an elongated shape with the aspect ratio of lateral dimensions greater than or equal to about 1.25, for example, greater than or equal to about 2, greater than or equal to about 4, and less than or equal to about 20, for example, less than or equal to about 8.0.

The anisotropic semiconductor nanocrystal particles may include a Group II-VI compound, a Group III-V compound, a Group IV-VI compound, a Group IV element or compound, or a combination thereof. As used herein, "a combination thereof" may refer to the case where the Group II-VI compound includes a Group III element and/or a Group V element or the case where the Group III-V compound includes a Group II element and/or a Group VI element, but it is not limited thereto.

The Group II-VI compound may be selected from:
a binary element compound selected from CdSe, CdTe, ZnS, ZnSe, ZnTe, ZnO, HgS, HgSe, HgTe, MgSe, MgS, and a combination thereof;
a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and
a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The Group III-V compound semiconductor may be selected from:
a binary element compound selected from GaN, GaP, GaAs, GaSb, AlN, AlP, AlAs, AlSb, InN, InP, InAs, InSb, and a combination thereof;
a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; and
a quaternary element compound selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group IV-VI compound may be selected from:
a binary element compound selected from SnS, SnSe, SnTe, PbS, PbSe, PbTe, and a combination thereof;
a ternary element compound selected from SnSeS, SnSeTe, SnSTe, PbSeS, PbSeTe, PbSTe, SnPbS, SnPbSe, SnPbTe, and a combination thereof; and
a quaternary element compound selected from SnPbSSe, SnPbSeTe, SnPbSTe, and a combination thereof.

The Group IV element or compound may be selected from:
a singular element selected from Si, Ge, and a combination thereof; and
a binary element compound selected from SiC, SiGe, and a combination thereof.

The binary element compound, the ternary element compound, or the quaternary element compound may be present in a uniform concentration in a particle, or may be present with a locally different concentration in a single particle.

The anisotropic semiconductor nanocrystal particle may have a heterostructure. For example, the semiconductor nanocrystal particle may have a core-shell structure wherein a semiconductor nanocrystal surrounds a different semiconductor nanocrystal.

In some embodiments, the nanorod may have a core-shell structure wherein the core may have a spherical shape, a rod shape, or polygonal shape, or ellipsoidal shape, but it is not limited thereto. For example, the nanorod may be a dot-in-rod type or a rod-in-rod type.

In the anisotropic semiconductor nanocrystal particle, an interface between the core and the shell may have a concentration gradient wherein the concentration of the element(s) of the shell decreases toward the core. The semiconductor nanocrystal may have a semiconductor nanocrystal core and a multi-layered shell surrounding the same. The multi-layered shell has at least two layers wherein each layer may have a single composition, an alloy, or a concentration gradient. When a shell material has a larger energy bandgap than that of the core, the semiconductor nanocrystal may exhibit a quantum confinement effect more effectively. In case of a multi-layered shell, a material of an outer layer may have a higher energy band gap than that of an inner layer (a layer that is closer to the core).

In some embodiments, the nanoplatelets may have a core-shell structure. For example, the nanoplatelet has a structure wherein a core nanoplatelet is passivated with a semiconductor nanocrystal shell.

The anisotropic semiconductor nanocrystal particle may have quantum efficiency of greater than or equal to about 50%, or greater than or equal to about 70%, or even greater than or equal to about 90%. The anisotropic semiconductor nanocrystal particle may have a full width at half maximum (FWHM) of the PL spectrum, which is less than or equal to about 45 nanometers (nm), for example less than or equal to about 40 nm, or less than or equal to about 30 nm. Within such ranges, a device may have enhanced color purity or improved color reproducibility.

Narrow emission spectra may be crucial for attaining high purity of primary red, green, and blue colors of individual LCD pixels. High purity of primary colors may provide better color saturation, and a high color gamut may be realized by mixing pure primary colors. From this perspective, colloidal QDs may be among the best options because of their narrow near-Gaussian emission spectra. In some embodiments, the full widths at half maximum (FWHM) of the anisotropic semiconductor nanocrystal particle may be between about 25 nm and 35 nm or between about 25 nm and 30 nm.

In some embodiments, higher color purity may be achieved for colloidal nanoplatelets (e.g., II-VI NPLs such as CdSe NPLs). For some NPLs, atomic level control over the thickness of the platelets may allow to yield emission with a narrow spectral linewidth. The CdSe nanoplatelets may have such polarized transitions, and thus may be used as a polarized emitter in an aligned film. It is believed that when the long dimensions of rectangular NPLs are aligned unidirectionally, a material with unprecedented color purity and polarized emission may be achieved.

In the anisotropic structure such as nanorods, the breaking of spherical symmetry may induce emission polarized along the long axis. For example, CdSe/CdS nanorod heterostructures are highly suitable as bright polarized emitters for LCDs, with photoluminescence quantum yields reported as high as 85% and potentially close to 100% with additional post-synthetic annealing. The growth of a CdS shell on a CdSe spherical or prolate core yields a highly-emissive near-perfect polarized light source, wherein the dielectric confinement forces a transition dipole to align along the long axis of the nanorod. In addition, the symmetry of excitonic transitions in CdSe/CdS nano-heterostructures may create large anisotropy of optical transitions beyond the simple dielectric effect expected for one-dimensional rods or wires. An array of unidirectionally aligned nanocrystals may provide a source of macroscopic polarized emission, which can be imagined as a backlighting layer in LCD devices (see FIG. 1).

Meanwhile, nanoplatelets (NPLs) and their core-shell heterostructures may provide another potential nanomaterial with anisotropic optical properties. Nanoplatelets with a two-dimensional electronic structure may show emission wavelengths dependent on thickness only. NPLs may provide the highest color purity owing to the unprecedented level of thickness control down to the atomic level.

The aforementioned anisotropic semiconductor nanocrystals may be synthesized via a wet chemical process.

In the wet chemical process, precursors react in an organic solvent to grow nanocrystal particles, and the organic solvent or a ligand compound may coordinate the surface of the semiconductor nanocrystal to control the growth of the nanocrystal. In the wet chemical process, a quantum dot or a nanorod may be used as a seed, on the surface of which a shell may grow to have a rod shape, thereby providing a heterostructure (e.g., nanorods) of a dot-in-rod or rod-in-rod type.

The dot-in-rod type nanorods may include a CdS rod that forms a Type I or Quasi-Type II system and has a CdSe core. The dot-in-rod type of nanorods may include a CdS rod that forms a Type II system and includes a ZnSe core.

Synthesis of the heterostructures may be carried out in (for example, successive) two steps. For example, a semiconductor nanocrystal for a seed is synthesized and a reaction for shell formation is carried out to form a rod shell on the seed crystal. For the reaction for shell formation, the semiconductor nanocrystal for the seed and a precursor for the shell formation (e.g., a non-metal precursor) may be quickly added to a hot solution that includes another precursor for the shell formation (e.g., a metal precursor) and at least one organic ligand (e.g., at least two types of the organic ligands) and has been heated at a high temperature of about 290° C. or higher, for example, about 300° C. or higher, or from about 310° C. to about 390° C.

After the synthesis, a non-solvent is added to a dispersion including the anisotropic semiconductor nanocrystal particles to precipitate and separate the particles. The non-solvent may be a polar solvent that is miscible with a reaction solvent but cannot disperse the nanocrystals. Types of the non-solvent may be selected considering the types of the reaction solvent, and the examples of the non-solvent may include, but are not limited to, acetone, ethanol, butanol, iso-propanol, a solvent having a solubility parameter similar to the foregoing, and a combination thereof. Separation may be carried out via centrifugation, precipitation, or evaporation. If desired, the separated nanocrystal particles may be added to a washing solvent and washed. Types of the washing solvent are not particularly limited, and it may be a solvent that has a solubility parameter similar to the solubility parameter of the ligand. Examples of the washing solvent may include hexane, heptane, octane, chloroform, toluene, benzene, and the like.

The backlight unit of an embodiment includes a photo-conversion layer wherein the aforementioned anisotropic semiconductor nanocrystal particles are arranged into unidirectional arrays. The unidirectional arrangement may be carried out by mechanical stretching. The mechanical stretching may be suitable for the production of a roll-to-roll processed film. In the photoconversion layer, the polymer matrix may include a polymer having a repeating unit of Chemical Formula 1:

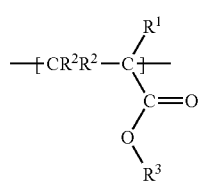

Chemical Formula 1 wherein $R^1$ is hydrogen or a methyl group, each $R^2$ is independently hydrogen or a 01 to C3 alkyl group, and $R^3$ is a C2 (e.g., C3) to C5 alkyl group.

The polymer exhibits an elastic behavior (elasticity) at a temperature between a glass transition temperature of the polymer and about 100° C., so that the mechanical stretching may provide high quality macroscopically polarized emitting areas.

The anisotropic nanocrystal particles dispersed in the polymer matrix may form unidirectionally aligned arrays, so that the photoconversion layer may emit polarized light.

The polymer has a glass transition temperature between about 10° C. and about 70° C., for example, between about 20° C. and about 60° C. The polymer may be dissolved in a solvent capable of dispersing the anisotropic semiconductor nanocrystal particles. The solvent may include chloroform, toluene, or a combination thereof. The polymer matrix may be uniaxially stretched. The polymer may include polypropyl(meth)acrylate, poly(propyl-co-isopropyl)(meth)acrylate, polybutyl(meth)acrylate, poly(butyl-co-isobutyl)(meth)acrylate, or a combination thereof. In the photoconversion layer, the amount of the anisotropic semiconductor nanocrystal particles may be greater than or equal to about 0.1 parts by weight, for example, greater than or equal to about 1 part by weight, or greater than or equal to about 5 parts by weight per 100 parts by weight of the polymer. In the photoconversion layer, the amount of the anisotropic semiconductor nanocrystal particles may be less than or equal to about 30 parts by weight, for example, less than or equal to about 25 parts by weight per 100 parts by weight of the polymer.

The state of the art in LCD technology involves the emissive quantum dots encapsulated in a glass capillary or in a polymer medium. Incorporation of polarized emitting structures necessitates not only integration into the existing QD-LCD technology but also efficient alignment of the structures to realize ensemble polarized emitting areas.

The aforementioned anisotropic nanocrystal particles may be dispersed in the aforementioned polymer matrix and mechanically strained to align the rods under the shear force of the polymer chains. The stretched films may be used as alignment media in polarizers, and to this end, the (meth)acrylate polymers having a relatively short alkyl chain may be effective.

In some embodiments, the photoconversion layer may be prepared by the following procedures.

A polymer-nanocrystal solution including the anisotropic semiconductor nanocrystal particles and the polymer may be prepared, and applied on a substrate (e.g., an inorganic substrate or an organic substrate) via an appropriate means (e.g., via drop-casting) and subsequently dried to yield homogenous, optically clear films (e.g., free-standing films). The obtained film may be highly luminescent under UV excitation and maintain brightness after stretching at elevated temperatures (such as about 60 to 70° C.). Relatively high loading concentrations (e.g., of greater than or equal to about 10 parts by weight or even of greater than or equal to about 20 parts by weight of the NCs with respect to 100 parts by weight of the polymer) can be attained for the layer without visible scattering, allowing for greater flexibility in terms of obtaining a desired optical density and a desired level of brightness.

The obtained film may be stretched at a temperature of greater than or equal to about the glass transition temperature of the polymer. The temperature for the stretching may be less than or equal to about 100° C., for example, less than or equal to about 70° C. Manners of the stretching are not particularly limited, and for example, manually stretching is possible. The stretching may be carried out in a water bath.

The film may be stretched to such an extent that the stretched standing film has a length of greater than or equal to about 1.5 times, for example, greater than or equal to about 2 times, greater than or equal to about 2.5 times, and less than or equal to about 6 times, for example, less than or equal to about 5 times, less than or equal to about 4 times, less than or equal to about 3.5 times, or less than or equal to about 3 times the initial length thereof. The stretching may be performed within a predetermined range in order to maximize the polarized emission while avoiding damage to the film. By the stretching, the alignment of the anisotropic semiconductor nanocrystal particles may be accomplished in the polymer matrix.

In non-stretched films, the anisotropic particles are randomly oriented. In low and intermediate concentration films, the dispersion of anisotropic particles is uniform whereas superstructure formation may occur as nanorod concentrations are increased. Such superstructures most typically may include stacks of aligned anisotropic particles. Strong unidirectional alignment may be observed after stretching of composite films at several concentrations as evidenced by slower decay of scattering intensity in the direction normal to polymer stretching in a small angle X-ray scattering (SAXS) spectrum.

Larger force and more extensive displacement of polymer chains may be required to align larger rods along the stretching direction. Hence, it is likely that the most efficient alignment of an ordered array requires that particles have a relatively small aspect ratio to efficiently respond to the mechanical force of polymer chains. The aforementioned anisotropic nanostructures may satisfy these requirements, and in the stretched polymer film, they may accomplish polarized emission.

The polarized light provided from the photoconversion layer may have a normalized degree of linear polarization (DOLP) of about 0.5 to about 0.85, wherein the DOLP is defined by Mathematical Formula 1:

$$(I_{//} - I_{\perp})/(I_{//} + I_{\perp}) \qquad \text{Mathematical Formula 1}$$

wherein the intensities represent integrated areas of the emission peaks from samples excited by unpolarized light and filtered at varying polarizer angles. $I_{//}$ is defined as the intensity passing through the polarization filter when the major axis of the polarization filter is parallel to the major axis of the semiconductor nanocrystal particle (i.e., the area of the PL peak measured at polarization along the stretching direction), and the $I_{\perp}$ is defined as the intensity passing through the polarization filter when the major axis of the polarization filter is perpendicular to the major axis of the semiconductor nanocrystal particle (i.e., the area of the PL peak measured at an angle 90 degrees away).

These two parameters may be related with a contrast ratio (CR), defined as $I_{//}/I_{\perp}$. In some embodiments, the photoconversion layer may show a contrast ratio of greater than or equal to about 3, for example, greater than or equal to about 4, or greater than or equal to about 5.

The electronic transitions of the anisotropic nanoparticles may be strongly polarized. For example, a single particle DOLP may reach 0.9 for rod-in-rods. Such arrays of anisotropic nanoparticles begin to approach single particle values, and the chief limitation of polarization approaching single-particle values is the distribution of orientation within the stretched film. Optical data may also be correlated with the degree of alignment in the case of nanorods, and in case of the nanorods, films prepared using the same nanorods may have higher contrast ratios when the angular distribution of aligned nanorods is smaller.

Samples with larger diameter fractions of core (e.g. CdSe core) material may have greater optical anisotropy and emission polarization. Between sufficiently aligned samples of differing compositions, films containing nanocrystals with the greatest diameter fraction of CdSe may demonstrate the highest polarization despite being less efficiently aligned.

Although less susceptible to efficient alignment, the NPLs may still demonstrate photoluminescence polarization. Aligned arrays of NPLs could be used to achieve polarized light emission with extremely narrow spectral width.

In some embodiments, the stretched polymer films containing aligned anisotropic nanostructures may show enhanced brightness.

The stretched films may show an ability of efficiently absorbing unpolarized light and re-emitting polarized light, and thus, the stretched films may find their utility in LCD applications. The brightness of films before and after stretching may be compared in order to quantify the efficiency of stretched versus non-stretched films. Based on the directionality experiments, it is expected to see an anisotropic direction of emission from an aligned film of the anisotropic nanostructures (e.g., nanorods). For example, in case of a sample of nearly spherical core-shell QDs, the change in the overall brightness before and after stretching is less than about 5%. However, in case of a film of nanorods, the intensity of the polarized emission after the stretching may be greatly increased at an identical optical density.

After stretching, the anisotropic nanocrystal particle polymer film of the embodiments may have a polarized emission which may be 50% greater or 100% greater than that of its non-stretched counterpart at the same optical density. Without wishing to be bound by any theory, it is understood that such an increase may be achieved through more efficient absorption and emission pathways—the dot-in-rods being laid flat along the film surface emit more photons normal to the film surface. These photons are more likely to escape the film without internal reflections.

The backlight unit of the aforementioned embodiments may further include a barrier layer disposed on the photoconversion layer. The barrier layer is a layer for protecting the photoconversion layer from the external environment such as moisture and oxygen. The barrier layer may include a metal inorganic oxide, but it is not limited thereto. The barrier layer may be prepared in any method or is commercially available.

The backlight unit may further include a light guide panel that is disposed between the light source and the photoconversion layer. The light guide panel for the backlight unit is commercially available.

The backlight unit may further include optical sheets that are disposed on the photoconversion layer to enhance polarized light emission.

In other embodiments, a method of producing the backlight unit may include obtaining the light source, preparing the photoconversion layer, and disposing the photoconversion layer on the light source. The preparation of the photoconversion layer is the same as explained above.

In another embodiment, a liquid crystal display device includes:
a liquid crystal panel including a lower substrate, an upper substrate, a liquid crystal layer interposed between the lower and upper substrates, and a color filter disposed a surface on the upper substrate; and
wherein the aforementioned backlight unit is disposed below the lower substrate of the liquid crystal panel.

The liquid crystal panel is not particularly limited, and any liquid crystal panel that is known in the art or is commercially available may be included. The liquid crystal panel may include a first polarizer disposed below the bottom surface of the lower substrate and a second polarizer disposed on the top or bottom surface of the upper substrate. The polarization direction of the first polarizer may be perpendicular to that of the second polarizer. In some embodiments, the color filter may be disposed on the top or bottom surface of the upper substrate, but it is not limited thereto. For example, the color filter may be disposed on a surface of the upper substrate opposite to the liquid crystal layer. The color filter may be disposed over the top surface of the second polarizer or below the bottom surface of the second polarizer.

FIG. 1 is an exploded view schematically showing a liquid crystal display device including a backlight unit in accordance with an embodiment.

Referring to FIG. 1, the liquid crystal display device includes a backlight unit, and a liquid crystal panel to provide a predetermined colored image using white light provided from the backlight unit.

According to non-limiting examples, the backlight unit includes a (e.g., light emitting diode ("LED")) light source (not shown), and a photoconversion layer to convert light emitted from the light source to white light. The photoconversion layer may include aligned anisotropic semiconductor nanocrystal particles, which is the same as set forth above. The backlight unit may further include a light guide panel (not shown) in order to guide the light from the light source to the photoconversion layer, and if desired, an optical film such as a diffusion panel, a prism sheet, a microlens sheet, a brightness enhancement film (e.g., a double brightness enhancement film ("DBEF")), or a combination thereof. The LED light source may include a plurality of LED chips emitting light of a predetermined wavelength. The LED light source may be an LED light source emitting blue light or UV. A reflecting plate (not shown) may be disposed on the bottom surface of the light guide panel.

Materials and structures of the LED light source, the light guide panel, the diffusion panel, and the liquid crystal panel are known in the art and are commercially available, and are not particularly limited.

The light emitted from the light source may be passed through the photoconversion layer and converted into mixed light of at least two colors (e.g., white light obtained by mixing blue light, green light, and red light).

In an embodiment, the photoconversion layer may include a plurality of layers. For example, when the LED light source is a blue LED light source, the photoconversion layer may include a red light conversion layer and a green light conversion layer that are sequentially stacked in a direction away from the LED light source.

On the photoconversion layer, a diffusion plate, a prism sheet, a microlens sheet, and a brightness enhancement film (e.g., a double brightness enhancement film ("DBEF")), or a combination thereof, may be further disposed, but it is not limited thereto. As explained above, the photoconversion layer may have significantly enhanced brightness so that use of such films may be omitted.

The polarized light provided from the backlight unit is incident toward the liquid crystal panel. The liquid crystal panel provides a predetermined color image using the light incident from the backlight unit.

Hereinafter, the embodiments of the invention are illustrated in more detail with reference to specific examples. However, they are exemplary embodiments, and the scope of the invention is not limited thereto.

EXAMPLES

Measurement

[1] Optical Characterization

For solution, optical measurements are conducted using dilute solutions of nanocrystals in toluene or hexane using UV-Vis (Cary-5000) and fluorescence (FluoroMax-4 and Fluorolog-3) spectrometers. Quantum yield is calculated with respect to Rhodamine 6G, OX170, or Cou53 with solution optical density at the excitation wavelength between 0.03 and 0.05.

Optical absorption of films is measured using the UV-Vis spectrometer (Cary-5000).

[2] Measurements of Polarized Emissions.

A modified microscope (Olympus BX51) is used to measure polarized emissions.

In a typical measurement of the transmitted emission, a blue excitation beam is created using a short-pass filter (cutoff at 492 nanometers (nm)) to filter the white light, and is then focused on the sample. The transmitted light passes through a polarizer before being collected by an objective.

The collected light is filtered by a bandpass filter (580-660 nm), and is then sent into a spectrometer (QEPro, Ocean Optics). Proper bandpass filters are chosen for nanorods emitting in different spectral regions. Polarized emissions can then be measured by adjusting the polarizer angle in the emission path.

Mapping of emission polarization is performed using a microscope (Olympus IX83) with an anisotropy module (DV Lambda, Photometrics) anisotropy module. Film samples are excited with polarized blue light (402/15 nm) and emission is monitored through an objective (60×, 0.65 NA) at the target wavelength. The emission beam is split and directed through parallel and perpendicular polarizers where it is detected by a CCD camera (Evolve 512 Delta, Photometrics).

[3] TEM Analysis

A transmission electron microscopic analysis is made using FEI Technai G2 F30 and Technai G2 Spirit electron microscopes.

Reference Example 1: Synthesis of CdSe/CdS Dot-in-Rod Nano-Hetero Structure

[1] Synthesis of CdSe Quantum Dots.

To a three-neck round bottom flask, CdO (0.060 grams (g)), n-octadecylphosphonic acid (ODPA, 0.308 g), and TOPO (3.0 g) are added and degassed for 1 hour (h) at RT and 1-2 h at 150° C. The flask is then heated to above 300° C. under a stream of $N_2$ and injected with TOP (1.5 g) when the solution is optically transparent. Trioctylphosphine selenide (TOPSe) (0.44 milliliters (mL) of 1.7 molar (M) solution) is injected at high temperatures, and the size of wurtzite cores is controlled by varying injection temperature and growth times.

For example, green-emitting cores are synthesized by injection of a Se precursor at 380° C. followed by immediate quenching with toluene, while red-emitting cores are synthesized by injection of the Se precursor at 370° C. with 5 minutes (min) of growth time.

Cores thus prepared are transferred to a glovebox and diluted to 20 mL in toluene. The seeds are precipitated with methanol and washed at least twice more by resuspension and precipitation with toluene and methanol. The seeds are stored in TOP and their concentrations are determined using the peak position of the first absorption.

[2] Synthesis of CdSe/CdS Nanorods.

For a CdS shell growth procedure, a three-neck round bottom flask containing CdO (0.060-0.207 g), ODPA (0.290-1.29 g), TOPO (2.0-3.0 g), and an additional short chain n-alkylphosphonic acid (hexyl (0.080 g) or propyl (0.015 g)) is degassed for 1 h at room temperature and 1 to 2 h at 150° C. The flask is heated to above 300° C. under a stream of $N_2$ and injected with TOP. The flask is then heated to varying temperatures (320 to 380° C.) and injected with a dispersion of trioctylphosphine sulfide (TOP, 0.5 to 1.6 g of 2.25 M) and a solution of w-CdSe (50 to 500 nanomoles (nmol)) in TOP. Shell-growth times are varied between 30 seconds (s) and 10 min. The resulting heterostructure nanorods are diluted to 20 mL in toluene and precipitated with ethanol. After resuspension in toluene, the particles are precipitated with 1% volume to volume (v:v) octylamine in ethanol. Nanostructures are stored in toluene with an excess of octylamine.

Reference Example 2: Synthesis of CdSe/CdS Rod-in-Rod Nano-Hetero Structure

Rod-in-rod type CdSe/CdS semiconductor nanocrystal particles are prepared in the same manner as Reference Example 1, except for a small variation in the synthesis of the seeds. Hexylphosphonic acid is added in ~1:1 molar ratio with ODPA and tributylphosphine selenide (TBPSe) replaces TOPSe as selenium precursor. The shell growth procedure is the same as in Reference Example 1.

Reference Example 3: Synthesis of CdSe Nanoplatelets

For "512 nm" nanoplatelets (NPL) synthesis, 170 milligrams (mg) $Cd(myristate)_2$ in 15 ml ODE are degassed at room temperature for 30 min. 12 mg of Se powder is added thereto and the system is degassed for 30 min at 90° C. Then the reaction mixture is rapidly heated up to 240° C. under nitrogen. At 190° C., when the solution turns orange-red, 40 mg of finely ground $Cd(OAc)_2$ is added. The reaction proceeds at 240° C. for 5 min, then the reaction mixture is quickly cooled to 150° C. and is allowed to further cool. At 70° C., a solution of 2 ml of oleic acid in 10 ml ODE is injected. When the system is cooled to room temperature, the NPLs are precipitated by centrifugation and re-dispersed in hexane. The nanoplatelets have an average thickness of about 2 unit cells (e.g., 4 MLs CdSe, 1.2 nm).

For "550 nm" nanoplatelet synthesis, the same ratios of $Cd(myristate)_2$ and Se powder are used. However, in this case a selenium dispersion is injected at 240° C. and 60 mg of finely ground $Cd(OAc)_2$ is added shortly thereafter. The reaction is allowed to run for 10 min and the same procedure as above is followed for additional oleic acid and storage.

The nanoplatelets have an average thickness of about 2.5 unit cells (e.g., 5 MLs CdSe, 1.5 nm) and an average lateral size of about 550 nm.

Reference Example 4: Synthesis of CdSe/CdS Core-Shell Nanoplatelets

A single monolayer of CdS shell is formed on the CdSe NPL in the following manner: NPLs are precipitated out of stock solution using ethanol and the centrifuged at 9000 rpm for 2 min. The solution is discarded and the NPLs are re-dispersed in 4 mL hexane. To the solution, 1 mL of NMF is added and 50 uL of ~50% aqueous ammonium sulfide to the NMF layer. After mixing the sample, the phases transfer and the hexane layer is discarded. After washing again with hexane, the particles are precipitated with toluene, centrifuged and then redispersed in NMF. The precipitation with toluene is then repeated and the solution is redispersed in 0.25 mL of NMF and 1.75 mL of 0.2 M cadmium acetate in NMF and the solution is stirred. The particles in solution are then precipitated with toluene and redispersed in 1 mL NMF after centrifugation. To transfer phases, 4 mL of hexane and 200 uL of dried 70% oleylamine are added. The NMF is removed and this solution is used for growth of a subsequent layer, or stored upon completion.

Reference Example 5: Characterization of the Anisotropic Semiconductor Nanocrystals as Synthesized

Figure 2A:
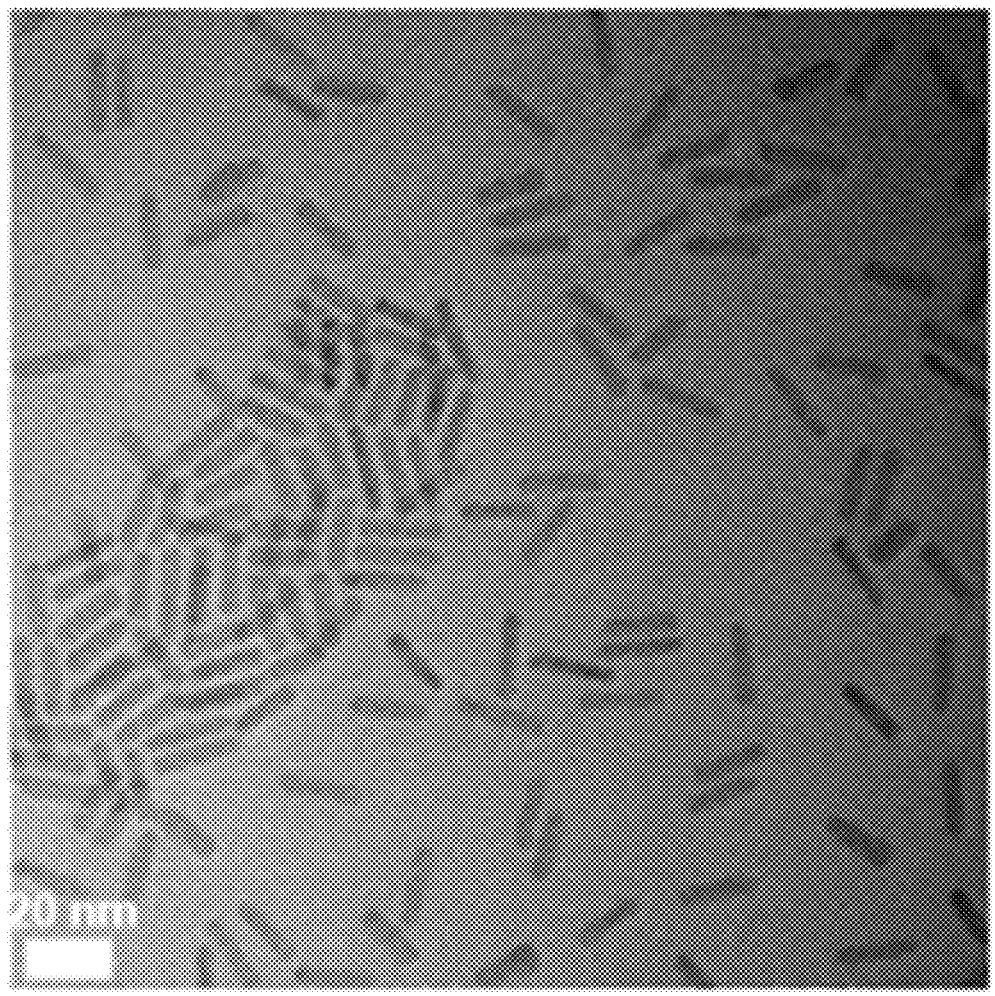
FIGS. 2A, 2B, and 2C are transmission electronic microscopic images of the anisotropic nanostructures according to an embodiment.
Figure 2A:
Figure 2B:
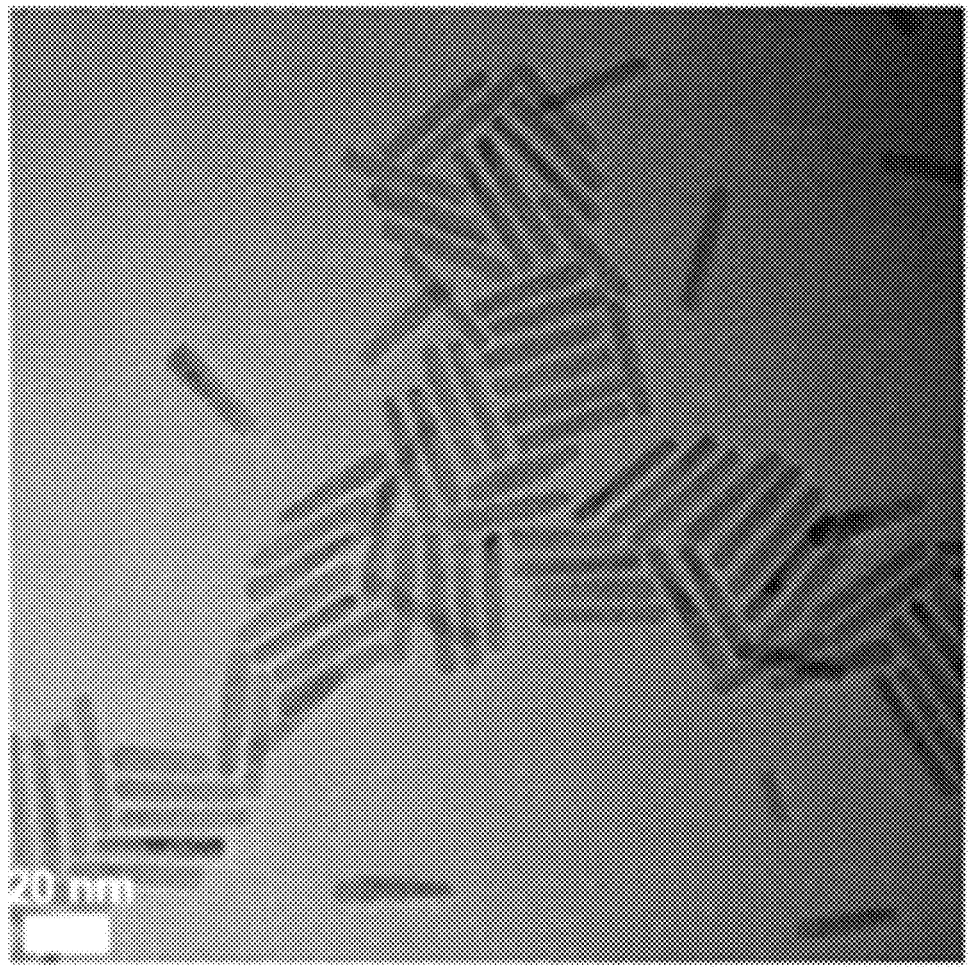
Figure 2B:
Figure 2C:
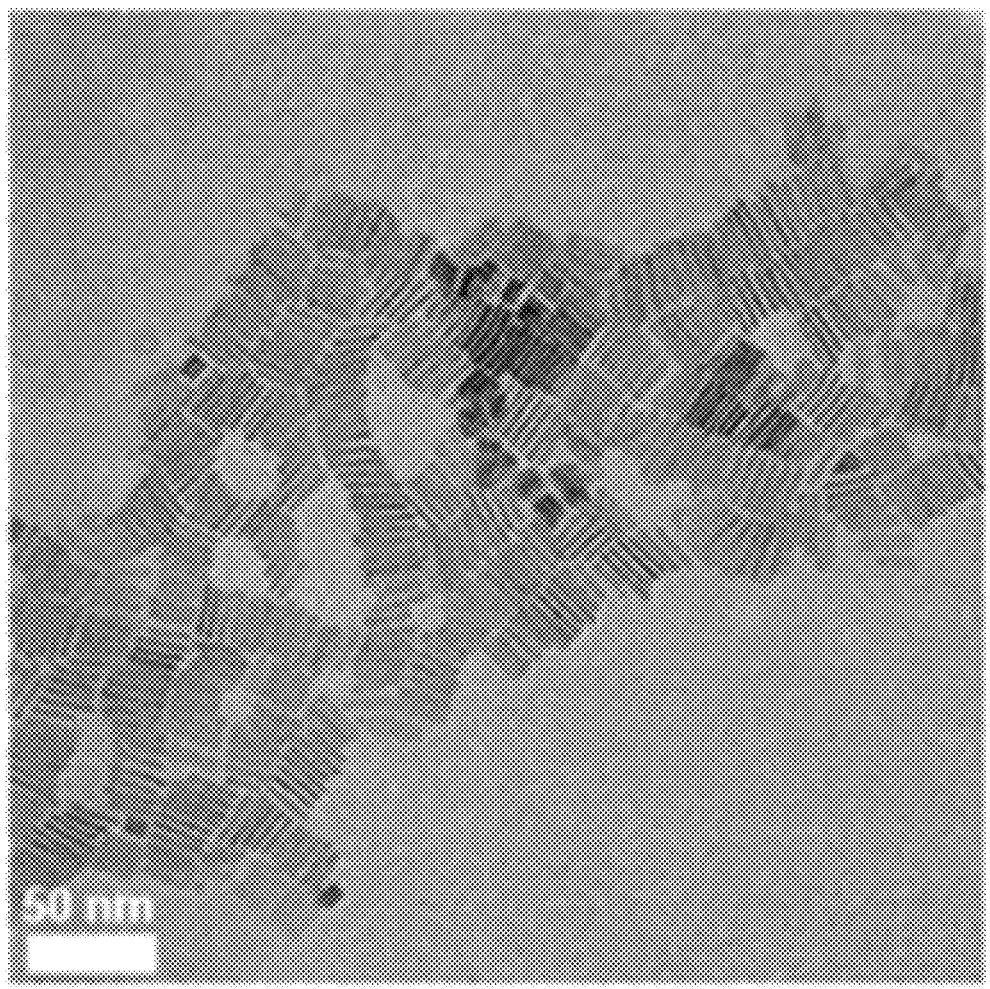
Figure 2D:
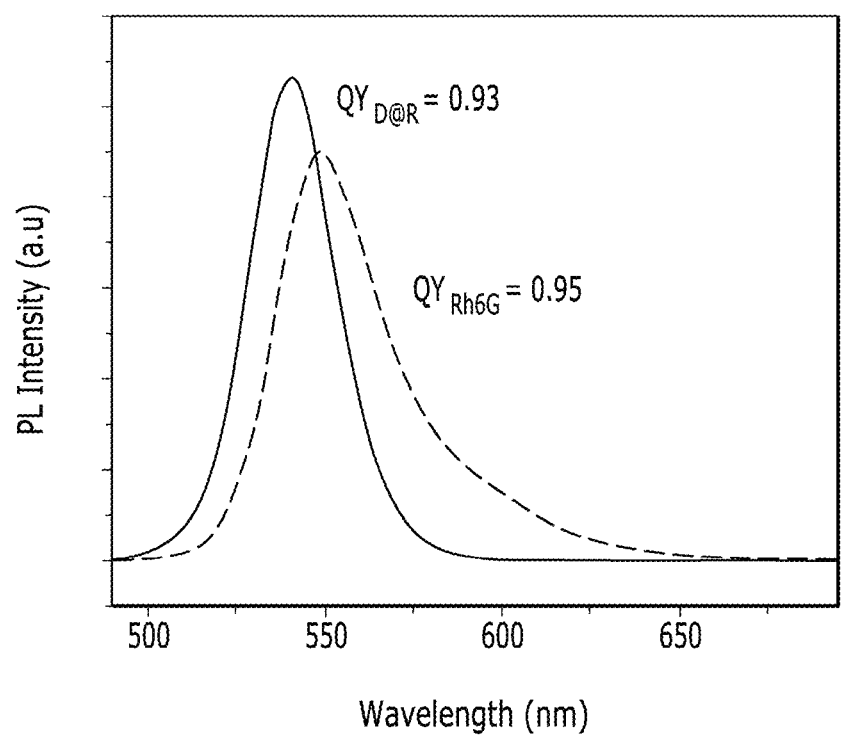
FIGS. 2D, 2E, and 2F are graphs of photoluminescence (PL) intensity (arbitrary units, a. u.) versus wavelength (nanometers, nm) illustrating PL spectra of the anisotropic nanostructures according to an embodiment.
Figure 2E:
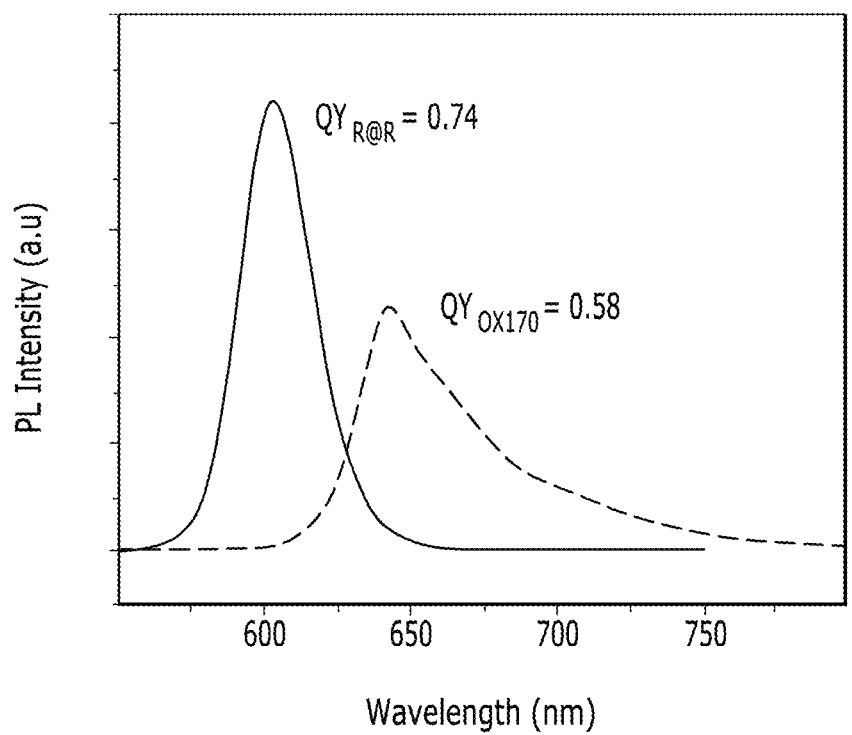
Figure 2F:
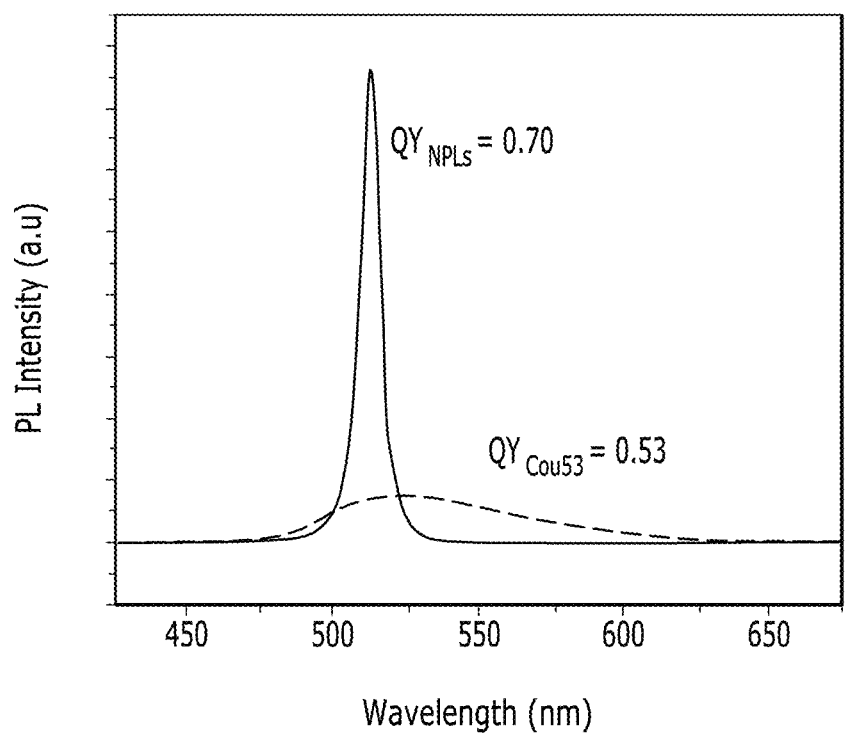

[1] FIGS. 2A, 2B, and 2C, and 2D, 2E, and 2F, show TEM images and PL spectra of the CdSe-based highly luminescent anisotropic nanostructures, respectively. FIG. 2A is a TEM image of CdSe/CdS dot-in-rods; FIG. 2B is a TEM image of CdSe/CdS rod-in-rods; and FIG. 2C is a TEM image of CdSe nanoplatelets. The nanostructure photoluminescence quantum yields are determined by comparison with organic standard dyes. FIG. 2D is a PL spectrum for CdSe/CdS dot-in-rods, FIG. 2E is a PL spectrum for CdSe/CdS rod-in-rods, and FIG. 2F is a PL spectrum of CdSe nanoplatelet.

[2] CdSe/CdS dot-in-rods synthesized Reference Example 1 include a spherical wurtzite CdSe core epitaxially integrated in a CdS rod (see TEM images). The optical characterization of the solution including the CdSe/CdS dot-in-rods confirm that the dot-in-rod CdSe/CdS have PL quantum yields of 70-90%, with highest yields of 93%, 77%, and 70% for green, orange, and red, respectively (see FIG. 2D). The full widths at half maximum (FWHM) are between 25 nm and 35 nm for CdSe/CdS nanorod heterostructures as synthesized. The lowest FWHMs were 28, 21, and 26 nm for the green, orange, and red dot-in-rods, respectively, with lowest FWHM of 28 nm for rod-in-rods. The rod-in-rod CdSe/CdS has a PL quantum yield reaching 74% (see FIG. 2E).

[3] The CdSe nanoplatelets (NPLs) have PL quantum yields of 50 to 70% (see FIG. 2F). In addition, the CdSe colloidal NPLs show significantly high color purity. The synthetic process of the reference examples may provide atomic level of thickness control for the platelets and thereby the blue to green emission with a narrow spectrum line width may be realized.

Example 1: Preparation of the Stretched Composite Including the Anisotropic Semiconductor Nanocrystal Particle and Polymer

[1] Investigation is made into systems with high dispersibility of nanorods, a Tg of slightly above room temperature, and elastic behavior at elevated temperatures.

[2] In this example, poly(butyl methacrylate)-co-(isobutyl methacrylate) (purchased from Sigma-Aldrich, Tg=35° C.) is used. For film preparation, the anisotropic semiconductor nanocrystals synthesized in reference examples (i.e., CdSe/CdS dot in rods, CdSe/CdZnS core-shell nanoplatelets, CdSe nanoplatelets) are added to a solution of 5 percent by weight (wt %) of the poly(butyl methacrylate)-co-(isobutyl methacrylate) in chloroform. To a glass substrate (22×22 millimeters (mm)), ~0.5 mL of solution is added to cover the entire area. The chloroform is evaporated at room temperature and then placed under vacuum for 24 h once most solvent is evaporated. The resulting anisotropic semiconductor nanocrystal-polymer composites are then delaminated from the slide. Freestanding films thus obtained are placed between two Teflon clamps and stretched by hand after submersion in a warm water bath (50-60° C.). While held under unidirectional tension, the films are subsequently submerged in cold water to set their conformation. The resulting films are often trimmed to isolate the unidirectionally stretched region and stored below room temperature to slow thermal relaxation.

Figure 3:
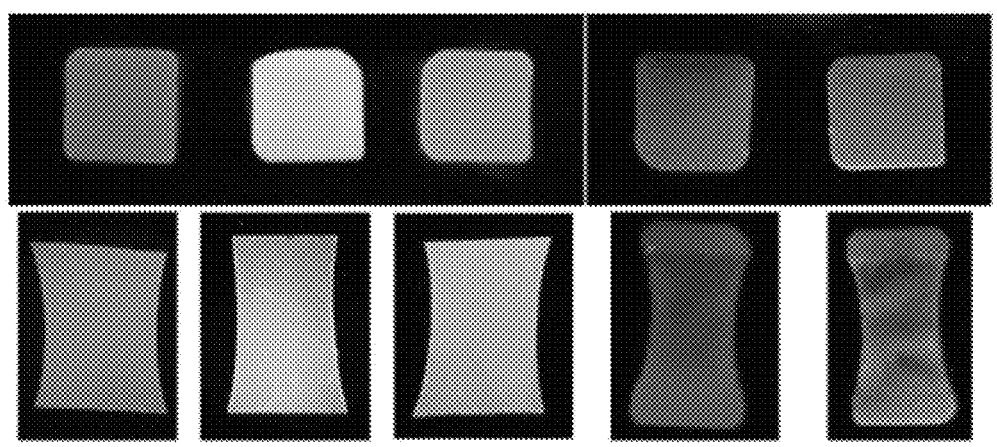
FIG. 3 is a photographic image of the photoluminescent nanoparticles-polymer composites including the anisotropic emissive nanocrystal particles dispersed in poly(butyl-co-isobutyl methacrylate) as prepared in Example 1.

[3] FIG. 3 shows photographic images for luminescent nanomaterial-polymer composite films consisting of luminescent nanocrystals dispersed in poly(butyl-co-isobutyl methacrylate) under UV light before and after stretching. The films include CdSe/CdS dot-in-rods with a 4.5 nm core, 3.8 nm core, or 2.1 nm core; CdSe/CdZnS nanoplatelets; and CdSe nanoplatelets, respectively.

Example 2: Emission Polarization of Anisotropic Nanostructures Aligned in Stretched Polymer Films

[1] For each of the films including CdSe/CdS dot-in-rods or rod-in-rods, a normalized degree of linear polarization (DOLP) is measured prior to or after the stretching.

Figure 4A:
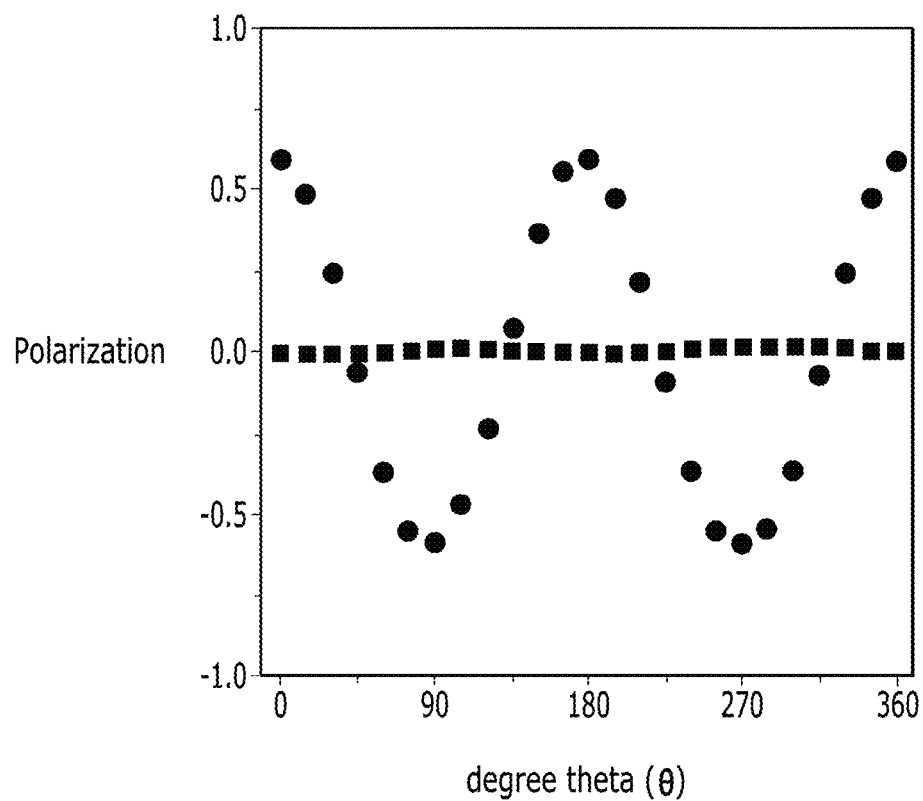
FIG. 4A is a diagram of polarization versus degree theta, which is a view showing polarization dependence of emitted light for samples of CdSe/CdS dot-in-rods before (squares) and after (circles) stretching.
Figure 4B:
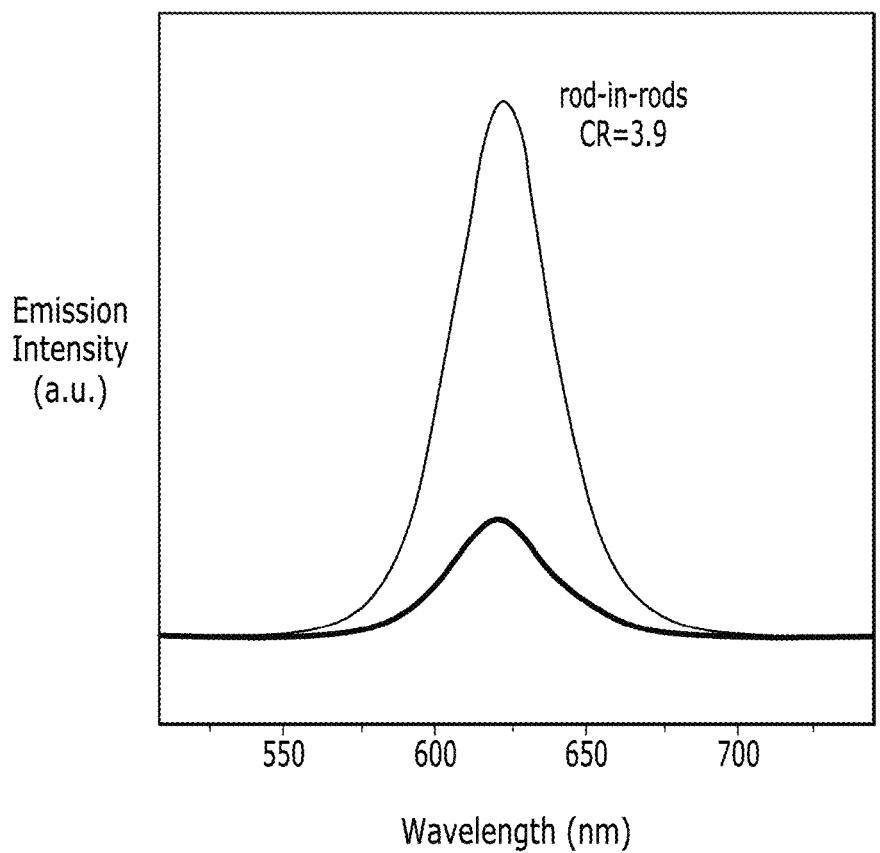
FIGS. 4B and 4C are graphs of emission intensity (arbitrary units, a. u.) versus wavelength (nanometers, nm) illustrating polarization emission of the stretched films prepared in Example 2.
Figure 4C:
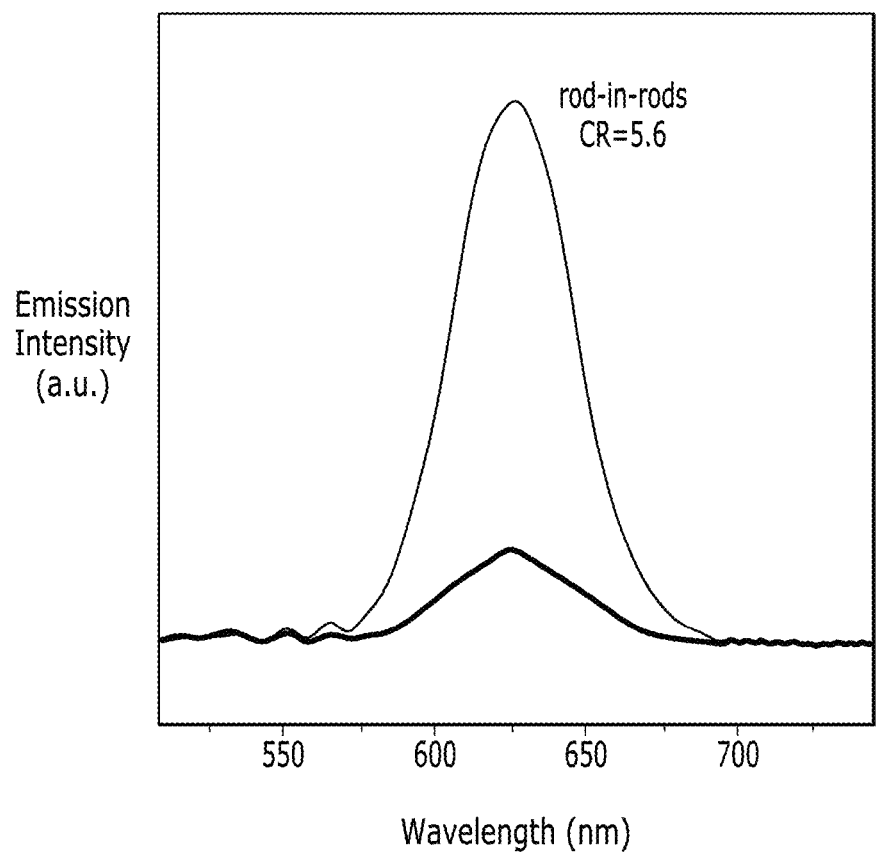

FIGS. 4A to 4D show polarized photoluminescence from the stretched film composites. FIG. 4A is a view showing polarization dependence of emitted light for samples of CdSe/CdS dot-in-rods before (squares) and after (circles) stretching. FIGS. 4B and 4C are views showing emission with polarization photo-selected parallel (thin line curves) and perpendicular (thick line curves) to the direction of stretching for two types of nanocrystals: dot-in-rods (35×5 nm; 3.5 nm core) and rod-in-rods (5.2×45 nm; 3.8×9.0 nm core). FIG. 4D is a view showing the mapping of fluorescence polarization for ~$10^3$ micron-sized areas of polymer films containing rod-in-rods before and after stretching. Polarization is calculated using two images obtained under parallel and perpendicular photo-selection and normalized with respect to contrast ratios measured in a simpler setup.

The results of FIG. 4A confirm that in the case of the stretched films, the measured DOLP is 0.6, while in the case of the non-stretched film, the measured polarization dependence is ±0.05. Therefore, the polarization degree (DOLP) increases by the stretching. The results of FIG. 4B confirm that in the dot-in-rod samples, the CR is 4:1, and the results of FIG. 4C confirm that in the rod-in-rods, the CR is 5.6.

To further probe the distribution of these polarized emitting films, the nanorod film microstructure is characterized by mapping the emission polarization of nanorods in the polymer matrix (FIG. 4D). The polarization map of an area of non-stretched film indicates a disordered sample with some possible areas of aggregation indicated by non-zero values (FIG. 4D). In stretched films, the polarization is high throughout the sample, with local minima of polarization indicating the presence of some higher concentration areas which are off-axis after stretching (FIG. 4D).

Example 3: Directional Emission from Anisotropic Nanostructures Aligned in Stretched Polymer Films Anisotropic nanoparticles may emit photons with different probability in different directions. An understanding of the directionality of light emission by anisotropic nanostructures is the key for achieving efficient macroscopic polarized emitting films. The results of the experiments are shown in FIG. 5. The detector is focused or slightly over-focused on the excitation spot and emission spectra are collected for several data points. Using such an optical setup, emission spectra are collected at different elevational and azimuthal angles.

Figure 5A:
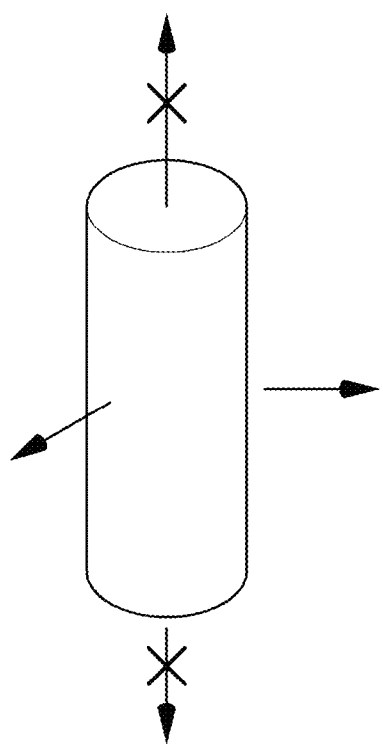
FIG. 5A is a schematic view related to theoretical emission directions for nanorods and nanoplatelet films in Example 3.
Figure 5B:
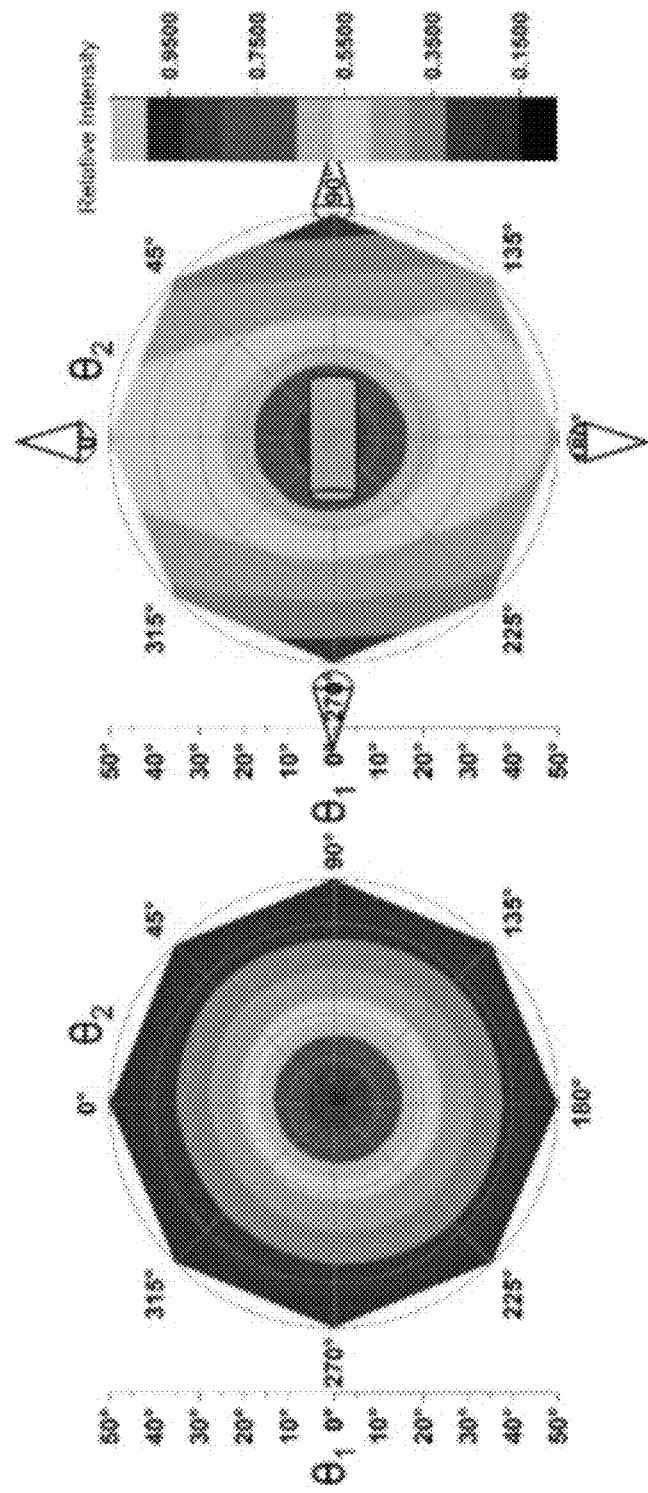
FIG. 5B is an intensity profile of a film of rod-in-rods before and after stretching demonstrated by a single rod as the ideal in Example 3.

FIG. 5A is related to theoretical emission directions for nanorods and nanoplatelet films, and FIG. 5B is an intensity profile of a film of rod-in-rods (5.2×45 nm; 3.8×9.0 nm core) before and after stretching demonstrated by a single rod as the ideal.

The directionality of emission intensity is measured to determine the angular distribution of emission as well as any anisotropy in the directional intensity. In comparison with the non-stretched film which is isotropic, the stretched film demonstrates a less intense drop-off in intensity. In CdSe/CdS nanorods, the orientation of the transition dipole causes emission to propagate normal to the long axis of the nanorod, whereas emission parallel to the long axis is weak. These far-field emission properties arise from the 1D polarization present in nanorod transitions. The electronic states are described by the projection of their angular momentum. Due to conservation of angular momentum, any emission directed along the c-axis would originate from recombination of electron-hole pairs perpendicular to this unique axis. Weaker propagation of emission along the c-axis is thus present due to stronger 1D transitions relative to the 2D transitions in the ab-plane. Thus, the propagation of light occurs in a cone along a plane perpendicular and bisecting the alignment (long) axis of the ensemble of nanorods; this anisotropy in distribution is consistent with our hypothesis of the increased brightness due to stretching alignment. This cone of emission is likely useful in many flat panel display applications due to the majority of viewing being done at wide angles horizontally as opposed to vertically. This effect may be even stronger for NPLs with an electronic structure of quantum wells whose emission is primarily normal to the well plane.

Figure 6A:
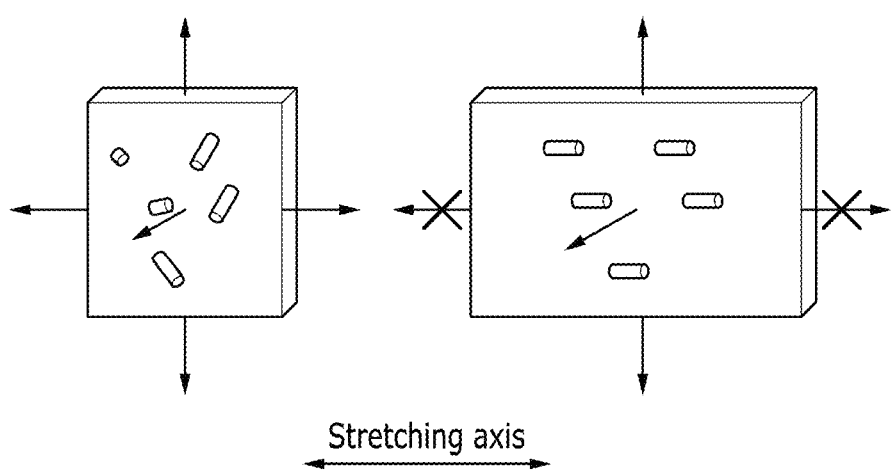
FIG. 6A is a view schematically showing directionality of emission after the alignment of the CdSe/CdS nanorods by the stretching of the film.

Example 4: Brightness Enhancement in Stretched Polymer Films Containing Aligned Anisotropic Nanostructures Based on the directionality experiments, it is expected to see an anisotropic direction of emission from an aligned film of nanorods. FIG. 6A schematically shows directionality of emission after stretching alignment of CdSe/CdS nanorods.

Figure 6B:
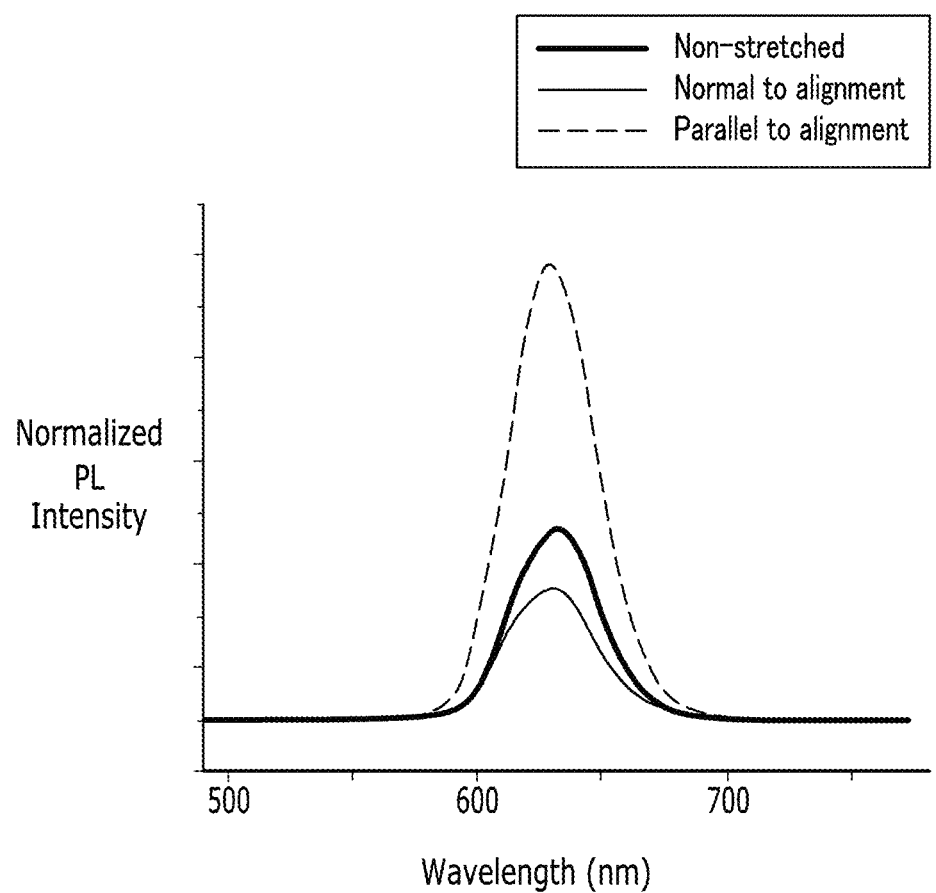
FIG. 6B is a graph of normalized photoluminescence (PL) intensity versus wavelength (nanometers, nm) showing film emission spectra normalized to optical density with respect to non-polarized light of films before and after alignment of CdSe/CdS rod-in-rods in Example 4.

Film emission normalized to optical density with respect to non-polarized light of films before and after alignment of CdSe/CdS rod-in-rods (5.2×45 nm; 3.8×9.0 nm core) is measured, and the results are shown in FIG. 6B. Films were excited with unpolarized blue light and emission was measured normal to the film surface. The thick solid curve represents a non-stretched film with random orientation of nanorods, with emission photo-selected parallel (dashed) and perpendicular (thin solid) for aligned films. The normalization also factors in the optical density of the polarization filter to relate the brightness of the non-stretched component.

The normalized brightness of films, estimated by the emission intensity as a function of the film optical density, was shown to significantly increase with respect to stretching of nanorod films (FIG. 6B). After stretching, a sample of dot-in-rods has a normalized emission which is 100% greater than that of its non-stretched counterpart (FIG. 6B).

Example 5: Orientation for Various Types of the Polymer Matrix

[1] Polymer-semiconductor nanocrystal particle composites are prepared in the same manner set forth in Example 1, except that instead of poly(butyl methacrylate)-co-(isobutyl methacrylate), poly(benzyl methacrylate) (Tg=55° C.), poly (cyclohexyl methacrylate) (Tg=83° C.), or poly(methylmethacrylate) are used. As the anisotropic semiconductor nanocrystal particles, the dot-in-rod type nanorods are used.

[2] In case of the composite of poly(benzyl methacrylate), the composite is brittle and hard to peel off from the glass slide even at an elevated temperature, and thus the stretching of the resulting composite is impossible. No CR is obtained from the prepared composite.

In case of the composite of poly(cyclohexyl methacrylate), it is somewhat brittle and cracks are easily formed during the stretching at room temperature and over a heat gun. No CR is obtained from the prepared composite.

In case of the composite of poly(methylmethacrylate), severe aggregation occurs when the anisotropic semiconductor nanocrystal particles are added, and thus it is impossible to obtain a composite having uniformly dispersed particles in the polymer matrix.

The aforementioned results confirm that the (meth)acrylate polymer having a relatively short alkyl chain is effective to obtain the composite.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A backlight unit comprising:
a light source; and
a photoconversion layer disposed separately from the light source to convert a wavelength of incident light from the light source and thereby provide converted light,
wherein the photoconversion layer comprises a polymer matrix and a plurality of anisotropic semiconductor nanocrystals disposed in the polymer matrix, and
wherein the polymer matrix comprises a copolymer comprising a plurality of different repeating units represented by Chemical Formula 1:

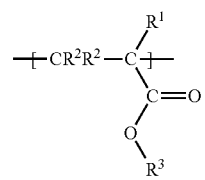

Chemical Formula 1 wherein $R^1$ is hydrogen or a methyl group, each $R^2$ is independently hydrogen or a C1 to C3 alkyl group, and $R^3$ is a C2 to C5 alkyl group,
wherein the copolymer exhibits elasticity at a temperature between a glass transition temperature of the copolymer and 100° C.,
wherein the photoconversion layer shows a contrast ratio (CR) defined as $I_\parallel/I_\perp$ of greater than or equal to 3.9, wherein
$I_\parallel$ is an integrated area of a photoluminescence peak of a photoluminescence spectrum of the converted light obtained when the major axis of a polarization filter is parallel to the aligned direction of the anisotropic semiconductor nanocrystals, and $I_\perp$ is an integrated area of a photoluminescence peak of a photoluminescence spectrum of the converted light obtained when the major axis of a polarization filter is perpendicular to the aligned direction of the anisotropic semiconductor nanocrystals, and wherein the plurality of anisotropic semiconductor nanocrystals are aligned along a long axis thereof for the photoconversion layer to emit polarized light.

2. The backlight unit of claim 1, wherein the glass transition temperature is between 10° C. and 70° C.

3. The backlight unit of claim 1, wherein the glass transition temperature is between 20° C. and 60° C.

4. The backlight unit of claim 1, wherein the polymer matrix is uniaxially stretched.

5. The backlight unit of claim 1, wherein the copolymer comprises poly(propyl-co-isopropyl)(meth)acrylate, poly(butyl-co-isobutyl)(meth)acrylate, or a combination thereof.

6. The backlight unit of claim 1, wherein the plurality of anisotropic semiconductor nanocrystals comprises a nanorod, a nanoplatelet, or a combination thereof.

7. The backlight unit of claim 6, wherein the nanorod comprises a dot-in-rod type, a rod-in-rod type, or a combination thereof.

8. The backlight unit of claim 1, wherein the plurality of anisotropic semiconductor nanocrystals comprises from the Periodic Table a Group II-VI compound, a Group III-V compound, a Group IV-VI compound, a Group IV element or compound, or a combination thereof.

9. The backlight unit of claim 1, wherein the plurality of anisotropic semiconductor nanocrystals has a quantum yield of greater than or equal to 70%.

10. The backlight unit of claim 1, wherein the plurality of anisotropic semiconductor nanocrystals has a full width at half maximum (FWHM) of less than or equal to 30 nanometers.

11. The backlight unit of claim 1, wherein the plurality of anisotropic semiconductor nanocrystals has an aspect ratio of 1.5 to 8.0.

12. The backlight unit of claim 1, wherein an amount of the anisotropic semiconductor nanocrystals is from 0.1 parts by weight to 30 parts by weight per 100 parts by weight of the copolymer.

13. The backlight unit of claim 1, wherein the polarized light from the converted light has a degree of polarization of 0.5 to 0.85 as defined by Mathematical Formula 1:

$$(I_\parallel - I_\perp)/(I_\parallel + I_\perp) \qquad \text{Mathematical Formula 1}$$

wherein $I_\parallel$ is an integrated area of a photoluminescence peak of a photoluminescence spectrum of the converted light obtained when the major axis of a polarization filter is parallel to the aligned direction of the anisotropic semiconductor nanocrystals, and $I_\perp$ is an integrated area of a photoluminescence peak of a photoluminescence spectrum of the converted light obtained when the major axis of a polarization filter is perpendicular to the aligned direction of the anisotropic semiconductor nanocrystals.

14. The backlight unit of claim 1, further comprising a barrier layer disposed on the photoconversion layer.

15. A method of producing a backlight unit of claim 1 comprising:
obtaining a light source;
preparing a light conversion layer;
and disposing the photoconversion layer on the light source, wherein the preparing of the photoconversion layer comprises obtaining a free-standing film comprising a polymer matrix and a plurality of anisotropic semiconductor nanocrystals disposed in the polymer matrix, wherein the polymer matrix comprises a copolymer comprising a plurality of different repeating units represented by Chemical Formula 1:

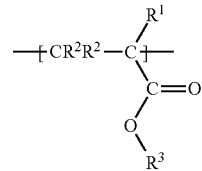

Chemical Formula 1 wherein $R^1$ is hydrogen or a methyl group, each $R^2$ is hydrogen or a C1 to C3 alkyl group, and $R^3$ is a C2 to C5 alkyl group, wherein the copolymer exhibits elasticity at a temperature between a glass transition temperature of the copolymer and 100° C., wherein the photoconversion layer shows a contrast ratio (CR) defined as $I_\parallel/I_\perp$ of greater than or equal to 3.9, wherein $I_\parallel$ is an integrated area of a photoluminescence peak of a photoluminescence spectrum of the converted light obtained when the major axis of a polarization filter is parallel to the aligned direction of the anisotropic semiconductor nanocrystals, and $I_\perp$ is an integrated area of a photoluminescence peak of a photoluminescence spectrum of the converted light obtained when the major axis of a polarization filter is perpendicular to the aligned direction of the anisotropic semiconductor nanocrystals, and wherein the plurality of anisotropic semiconductor nanocrystals are aligned along a long axis thereof for the photoconversion layer to emit polarized light, and stretching the free-standing film at a temperature of greater than or equal to the glass transition temperature of the polymer.

16. The method of claim 15, wherein the stretching is carried out at a temperature of less than or equal to 100° C.

17. The method of claim 15, wherein the stretching is conducted in such a way that a length of the stretched standing film is less than or equal to 6 times an initial length thereof.

18. A liquid crystal display comprising:
a liquid crystal panel comprising a lower substrate, an upper substrate, a liquid crystal layer interposed between the lower substrate and the upper substrate, and a color filter disposed on a surface of the upper substrate; and
a backlight unit of claim 1, wherein the backlight unit is disposed below the liquid crystal panel.

19. A semiconductor nanocrystal-polymer composite, comprising:
a polymer matrix and a plurality of anisotropic semiconductor nanocrystals disposed in the polymer matrix, wherein the polymer matrix comprises a copolymer comprising a plurality of different repeating units represented by Chemical Formula 1:

Chemical Formula 1

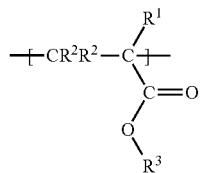

wherein $R^1$ is hydrogen or a methyl group, each $R^2$ is hydrogen or a C1 to C3 alkyl group, and $R^3$ is a C3 to C5 alkyl group, wherein the copolymer exhibits elasticity at a temperature between a glass transition temperature of the copolymer and 100° C., wherein the photoconversion layer shows a contrast ratio (CR) defined as $I_{\parallel}/I_{\perp}$ of greater than or equal to 3.9, wherein $I_{\parallel}$ is an integrated area of a photoluminescence peak of a photoluminescence spectrum of the converted light obtained when the major axis of a polarization filter is parallel to the aligned direction of the anisotropic semiconductor nanocrystals, and $I_{\perp}$ is an integrated area of a photoluminescence peak of a photoluminescence spectrum of the converted light obtained when the major axis of a polarization filter is perpendicular to the aligned direction of the anisotropic semiconductor nanocrystals, and wherein the plurality of anisotropic semiconductor nanocrystals are aligned along a long axis thereof for the photoconversion layer to emit polarized light.

* * * * *